US012437706B2

(12) United States Patent
Lee et al.

(10) Patent No.: US 12,437,706 B2
(45) Date of Patent: Oct. 7, 2025

(54) DISPLAY DEVICE AND METHOD FOR MONITORING OPERATION OF PIXELS

(71) Applicant: SAMSUNG DISPLAY CO., LTD., Yongin-si (KR)

(72) Inventors: Jae Hoon Lee, Yongin-si (KR); Jung Taek Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 135 days.

(21) Appl. No.: 18/452,691

(22) Filed: Aug. 21, 2023

(65) Prior Publication Data

US 2024/0119891 A1 Apr. 11, 2024

(30) Foreign Application Priority Data

Oct. 5, 2022 (KR) ........................ 10-2022-0127325

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/0294* (2013.01)

(58) Field of Classification Search
CPC ............. G09G 3/32; G09G 2310/0275; G09G 3/3275; G09G 2310/0267; G09G 2300/0426; G09G 2320/0295; G09G 2300/0819; G09G 3/3233; G09G 2300/0842; G09G 2310/08; G09G 2320/045; G09G 3/006; G09G 2330/028; G09G 2310/0294
See application file for complete search history.

(56) References Cited

U.S. PATENT DOCUMENTS

| | | | | |
|---|---|---|---|---|
| 10,547,316 | B2 | 1/2020 | Takasugi et al. | |
| 10,803,810 | B2 | 10/2020 | Takasugi | |
| 11,107,404 | B2 | 8/2021 | Park | |
| 11,417,284 | B2 | 8/2022 | Kim et al. | |
| 2018/0083078 | A1* | 3/2018 | Park | H10K 59/123 |
| 2018/0254009 | A1* | 9/2018 | Li | G09G 3/3266 |

(Continued)

FOREIGN PATENT DOCUMENTS

| | | |
|---|---|---|
| KR | 10-1987078 | 10/2019 |
| KR | 10-2020-0029178 | 3/2020 |
| KR | 10-2020-0057295 | 5/2020 |

(Continued)

*Primary Examiner* — Muhammad N Edun
(74) *Attorney, Agent, or Firm* — F.CHAU & ASSOCIATES, LLC

(57) ABSTRACT

A display device may include a display panel including first and second pixels respectively connected to first and second sensing lines, a sensing driver including a sensing channel shared by the first and the second sensing lines, and a controller configured to control the display panel and the sensing driver. The controller may be configured to, in a first time period, electrically disconnect the sensing channel from the first and the second sensing lines, and reflect electrical characteristics of the first and the second pixels in the first and the second sensing lines, respectively, as sensing voltages, and in a second time period, record the sensing voltages reflected in the first and the second sensing lines in the sensing channel by time-sharing.

25 Claims, 18 Drawing Sheets

(56) References Cited

U.S. PATENT DOCUMENTS

| | | | | |
|---|---|---|---|---|
| 2021/0150966 | A1* | 5/2021 | Yang | G09G 3/3233 |
| 2021/0183299 | A1* | 6/2021 | Park | G09G 3/2074 |

FOREIGN PATENT DOCUMENTS

| | | |
|---|---|---|
| KR | 10-2020-0077812 | 7/2020 |
| KR | 10-2021-0083946 | 7/2021 |
| KR | 10-2338948 | 12/2021 |
| KR | 10-2022-0033577 | 3/2022 |

* cited by examiner

DISPLAY DEVICE AND METHOD FOR MONITORING OPERATION OF PIXELS

CROSS-REFERENCE TO RELATED APPLICATION

The present application claims priority to Korean patent application number 10-2022-0127325, filed on Oct. 5, 2022, the entire disclosure of which is incorporated by reference herein in its entirety.

BACKGROUND

Field of Invention

Various embodiments of the present disclosure relate to an electronic device, and more particularly, to a display device and a method for monitoring the operation of pixels.

Description of Related Art

Various types of display devices have been developed. Examples include liquid crystal display devices and organic light emitting display devices. A display device includes a plurality of pixels which emit light to display images with various colors at various luminance levels. The pixels may include pixel circuits having substantially the same structure.

However, due to various reasons (e.g., process deviations, frequency of use of each pixel, degree of degradation of each pixel, etc.), mobility, threshold voltages of transistors of pixel circuits, and/or other electrical characteristics may differ from each other. In addition, light emitting diodes of the pixels may have deviations in threshold voltages thereof.

The information disclosed in this Background section is only for enhancement of understanding of the background of the described technology and therefore it may contain information that does not form the prior art that is already known to a person of ordinary skill in the art.

SUMMARY

An embodiment of the present disclosure may provide a display device including: a display panel including first and second pixels respectively connected to first and second sensing lines; a sensing driver including a sensing channel shared by the first and the second sensing lines; and a controller configured to control the display panel and the sensing driver. The controller may be configured to: in a first time period, electrically disconnect the sensing channel from the first and the second sensing lines, and reflect electrical characteristics of the first and the second pixels in the first and the second sensing lines, respectively, as sensing voltages; and in a second time period, record the sensing voltages reflected in the first and the second sensing lines in the sensing channel by time-sharing.

The controller may be configured to: initialize the sensing channel before the sensing voltage reflected in the first sensing line is recorded in the sensing channel; and initialize the sensing channel before the sensing voltage reflected in the second sensing line is recorded in the sensing channel.

The sensing driver may further include a first switch and a second switch. An input node of the sensing channel may be connected to the first sensing line through the first switch, and may be connected to the second sensing line through the second switch. The first and the second switches may be turned off during the first time period.

The sensing channel may include a sampling capacitor connected to the input node. The sensing voltages reflected in the first and the second sensing lines may be recorded in the sampling capacitor by time-sharing.

The sensing channel may be configured to, in response to control signals from the controller, initialize the sampling capacitor before the sensing voltage reflected in the first sensing line is recorded in the sampling capacitor, and initialize the sampling capacitor before the sensing voltage reflected in the second sensing line is recorded in the sampling capacitor.

The sensing channel may include: a third switch configured to connect a first end of the sampling capacitor to the input node in response to a first control signal; a fourth switch configured to connect the first end of the sampling capacitor to an initialization voltage node in response to a second control signal; and a fifth switch configured to connect a second end of the sampling capacitor to a reference voltage node in response to a third control signal.

The sensing channel may further include a reference capacitor. A first end of the reference capacitor may be connected to the first end of the sampling capacitor. The second end of the sampling capacitor and a second end of the reference capacitor may form output ends of the sensing channel.

The display device may further include a data driver connected to the first and the second pixels through first and second data lines. The controller may control the data driver. The data driver may be configured to: apply a first reference data voltage to the first and the second pixels through the first and the second data lines in the first time period; and apply a second reference data voltage lower than the first reference data voltage to the first and the second pixels through the first and the second data lines in the second time period.

The display device may further include a scan driver configured to operate under control of the controller. The display panel may further include a first switch connected between the first pixel and the first sensing line, and a second switch connected between the second pixel and the second sensing line. The scan driver may be configured to transmit a sensing select signal to the first and the second switches and turn on the first and the second switches in the first time period, and turn off the first and the second switches before the second time period starts.

The display device may further include a scan driver configured to operate under control of the controller. The first and the second pixels may be respectively connected to first and second data lines. Each of the first and the second pixels may include a switching transistor configured to transmit, in response to a scan signal, a voltage signal received through the corresponding data line to the corresponding pixel. The scan driver may be configured to provide the scan signal, turn on the switching transistor in the first time period, and turn off the switching transistor before the second time period starts.

The sensing driver further comprises a data output circuit configured to output sensing data in response to each of the sensing voltages recorded in the sensing channel by time-sharing.

An embodiment of the present disclosure may provide a display device including: a display panel including a plurality of rows of pixels connected to a plurality of sensing lines, the plurality of sensing lines being grouped into sensing line groups; a sensing driver including sensing channels respectively allocated to the sensing line groups; and a controller configured to control the display panel and the sensing driver. The controller may be configured to: in a first time period, electrically disconnect the sensing channels from the plurality of sensing lines, and reflect electrical characteristics of the plurality of pixels in the plurality of sensing lines as sensing voltages; and in a second time period, record the sensing voltages of the sensing lines included in each of the sensing line groups in the corresponding sensing channel by timing-sharing.

The controller may be configured to, before each time the sensing voltages of the sensing lines included in each of the sensing line groups are recorded in the corresponding sensing channel by time-sharing, initialize the corresponding sensing channel.

The display device may further include a data driver connected to the plurality of pixels through a plurality of data lines. The controller may be configured to control the data driver. The data driver may be configured to: in the first time period, apply a first reference data voltage to the plurality of pixels through the plurality of data lines; and in the second time period, apply a second reference data voltage lower than the first reference data voltage to the plurality of pixels through the plurality of data lines.

The display device may further include a scan driver configured to operate under control of the controller. The display panel may further include a plurality of switches connected between the plurality of pixels and the plurality of sensing lines. The scan driver may be configured to transmit a sensing select signal to the plurality of switches, turn on the plurality of switches in the first time period, and turn off the plurality of switches before the second time period starts.

The display device may further include a scan driver configured to operate under control of the controller. The plurality of pixels may be respectively connected to a plurality of data lines. Each of the plurality of pixels may include a switching transistor configured to transmit, in response to a scan signal, a voltage signal received through the corresponding data line to the corresponding pixel. The scan driver may be configured to provide the scan signal, turn on the switching transistor in the first time period, and turn off the switching transistor before the second time period starts.

An embodiment of the present disclosure may provide a method of performing an operation of sensing pixels. First and second pixels among the pixels are respectively connected to first and second sensing lines, The method include: reflecting, in a first time period, electrical characteristics of the first and the second pixels in the first and the second sensing lines, respectively, as sensing voltages; electrically disconnecting a sensing channel shared by the first and the second sensing lines from the first and the second sensing lines while the sensing voltages are reflected in the first and the second sensing lines; and in a second time period, connecting the first and the second sensing lines to the sensing channel by time-sharing, and successively recording the sensing voltages reflected in the first and the second sensing lines in the sensing channel.

The method may further include: initializing the sensing channel before the sensing voltage reflected in the first sensing line is recorded in the sensing channel; and initializing the sensing channel before the sensing voltage reflected in the second sensing line is recorded in the sensing channel.

DETAILED DESCRIPTION

Figure 1:
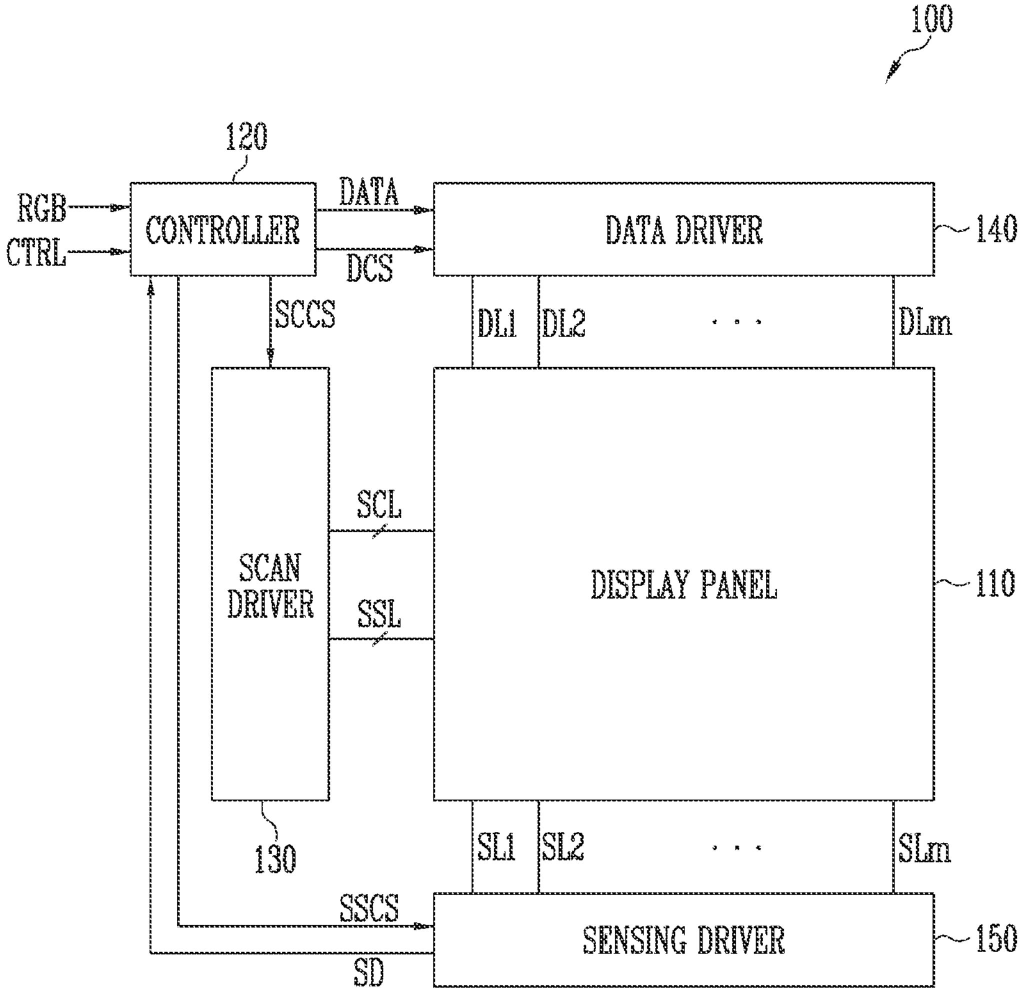
FIG. 1 illustrates an embodiment of a display device.

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element. In the present disclosure, the singular forms are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Features of the present disclosure, and methods for achieving the same will be cleared with reference to embodiments described later in detail together with the accompanying drawings. However, it is to be noted that the present disclosure is not limited to the embodiments but can be embodied in various other ways. In this specification, "connected/coupled" refers to one component not only directly coupling another component but also indirectly coupling another component through an intermediate component. In addition, in an embodiment of the present disclosure, the term "connection" between two components may embrace electrical connection and physical connection.

In accordance with one or more embodiments, a display device is provided in which two sensing lines share a single sensing channel (in order to reduce the surface area of the display device). Respective ones of the sensing lines carry voltages that reflect electrical characteristics of pixels under different sensing conditions (or different sensing schemes).

The voltages may be selectively transmitted to a shared sensing channel to generate sensing data. Through these features, deterioration in the reliability of a sensing operation may be prevented, and any influence that may adversely affect a compensation value to be applied to driving conditions may also be prevented. As a result, the reliability of the display device may be significantly improved.

FIG. 1 is a block diagram illustrating a display device 100 in accordance with an embodiment of the present disclosure.

Referring to FIG. 1, the display device 100 may include a display panel 110, a controller 120, a scan driver 130, a data driver 140, and a sensing driver 150. The display panel 110 may include pixels which may be connected to the scan driver 130 by scan lines SCL and sensing select lines SSL. The pixels may be connected to the data driver 140 by first to m-th data lines DL1 to DLm. The pixels may be connected to the sensing driver 150 by first to m-th sensing lines SL1 to SLm.

The display panel 110 may be one of various types of display panels. Examples include a light emitting diode (LED) panel and a liquid crystal display panel (LCD). Hereinafter, there will be described the case where the pixels include light emitting diodes, and the display panel 110 is a light emitting diode panel. However, embodiments are not limited thereto, and the display panel 110 may be any one of other types of display panels.

The controller 120 may receive an image signal RGB and a control signal CTRL from an external device. The controller 120 may convert a data format of the image signal RGB to a format suitable for interface with the data driver 140, and generate an image data signal DATA. The controller 120 may output a scan control signal SCCS, a data control signal DCS, and a sensing control signal SSCS based on the control signal CTRL.

The scan driver 130 may be connected to rows of pixels of the display panel 110 by the scan lines SCL. The scan driver 130 may apply scan signals to the scan lines SL in response to the scan control signal SCCS. Furthermore, the scan driver 130 may be connected to the rows of pixels of the display panel 110 by the sensing select lines SSL. During operations of sensing electrical characteristics of the pixels to be described in greater detail below, the scan driver 130 may apply a sensing select signal to the sensing select lines SSL in response to the scan control signal SCCS, and select each of the rows of pixels.

The data driver 140 may receive the data control signal DCS and the image data DATA from the controller 120. The data driver 140 may output analog voltage signals to the first to m-th data lines DL1 to DLm in response to the image data signal DATA. The analog voltage signals may correspond to grayscale values corresponding to the image data signal DATA. Hence, the analog voltage signals may be provided to the pixels of a row that receives a scan signal. The light emitting diodes of the corresponding pixels may emit light in response to the provided analog voltage signals.

The sensing driver 150 may receive the sensing control signal SSCS from the controller 120. The sensing driver 150 may be connected to columns of the pixels of the display panel 110 by first to m-th sensing lines SL1 to SLm. The sensing driver 150 may be configured to sense electrical characteristics of the pixels of a selected row through the first to m-th sensing lines SL1 to SLm in response to the sensing control signal SSCS, and generate sensing data SD.

Figure 2:
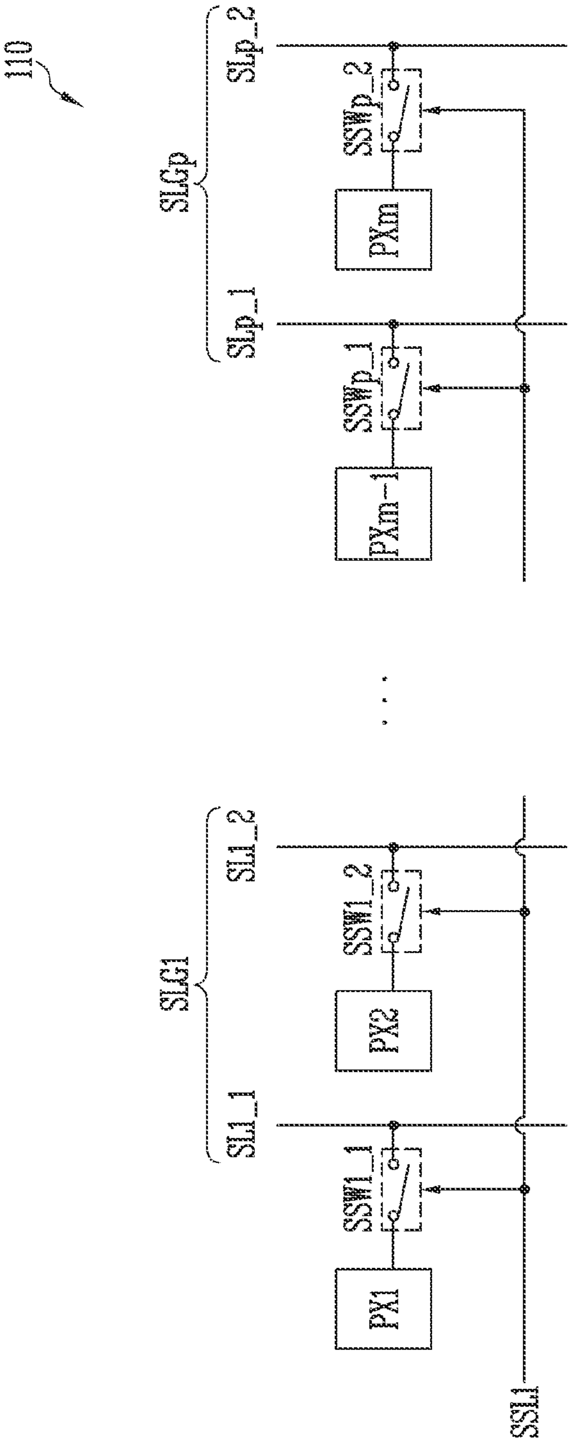
FIG. 2 illustrates an embodiment of a portion of a display panel.

FIG. 2 is a block diagram illustrating an embodiment of a portion of the display panel 110 of FIG. 1. In particular, FIG. 2 illustratively shows pixels PX1 to PXm connected to a first sensing select line SSL1 among the sensing select lines SSL of FIG. 1.

Referring to FIGS. 1 and 2, each of the first to m-th pixels PX1 to PXm may be connected to the first to m-th sensing lines SL1 to SLm of FIG. 1. The first to m-th sensing lines SL1 to SLm of FIG. 1 may be grouped into sensing lines groups. In embodiments, the first to m-th sensing lines SL1 to SLm may be defined as sensing line pairs, each having two sensing lines. The first to m-th sensing lines SL1 to SLm may be grouped into first to p-th sensing line groups SLG1 to SLGp. Each sensing line group may include a plurality of (e.g., two) sensing lines connected to two adjacent pixels. In other embodiments, each sensing line group may include more than two sensing lines.

In accordance with one example, the first sensing line group SLG1 may include an odd sensing line SL1_1 and an even sensing line SL1_2. The odd sensing line SL1_1 may be connected to the first pixel PX1, and the even sensing line SL1_2 may be connected to the second pixel PX2. For example, the p-th sensing line group SLGp may include an odd sensing line SLp_1 and an even sensing line SLp_2. The odd sensing line SLp_1 may be connected to the m−1-th pixel PXm−1, and the even sensing line SLp_2 may be connected to the m-th pixel PXm. Here, p is an integer of m/2.

The display panel 110 may include switches SSW1_1, SSW1_2, SSWp_1, and SSWp_2 which respectively connect the first to m-th pixels PX1 to PXm to the corresponding sensing lines. The switch SSW1_1 may connect the first pixel PX1 to the odd sensing line SL1_1 of the first sensing line group SLG1 in response to a sensing select signal of the first sensing select line SSL1. The switch SSW1_2 may connect the second pixel PX2 to the even sensing line SL1_2 of the first sensing line group SLG1 in response to a sensing select signal. The switch SSWp_1 may connect the m−1-th pixel PXm−1 to the odd sensing line SLp_1 of the p-th sensing line group SLGp in response to a sensing select signal. The switch SSWp_2 may connect the m-th pixel PXm to the even sensing line SLp_2 of the p-th sensing line group SLGp in response to a sensing select signal.

Figure 3:
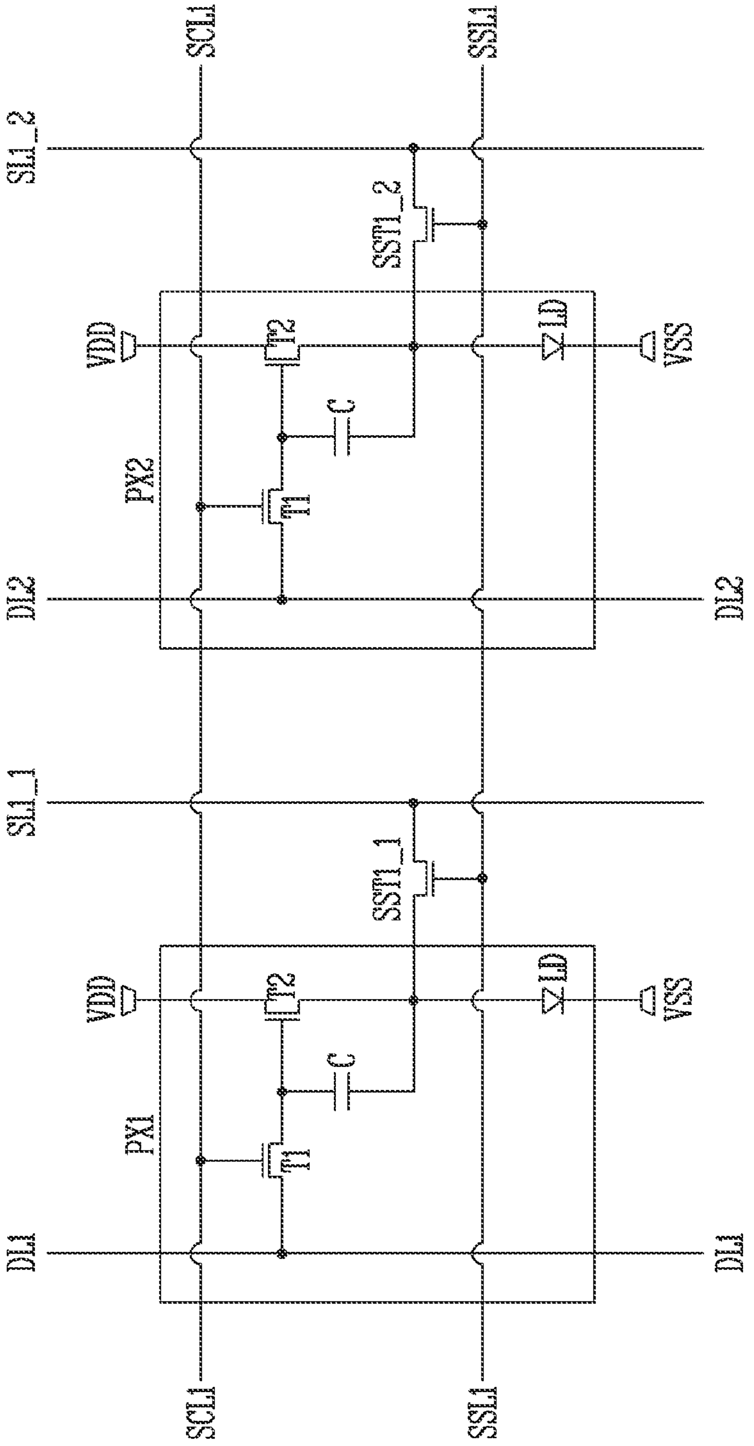
FIG. 3 illustrates an embodiment of pixels.

FIG. 3 is a circuit diagram illustrating an embodiment of some of the pixels that are shown in FIG. 2. For convenience of explanation, FIG. 3 illustrates the first and second pixels PX1 and PX2 of FIG. 2 as a representative example, and the other pixels may have the same configuration.

Referring to FIG. 3, the first pixel PX1 may include a plurality of transistors T1 and T2, a capacitor C, and a light emitting diode LD. The switching transistor T1 may connect a gate of the driving transistor T2 to a first data line DL1 in response to a scan signal of the first scan line SCL1, among the scan lines SCL of FIG. 1. The driving transistor T2 may be connected between a first power supply VDD and an anode of the light emitting diode LD, and include a gate connected to one end of the switching transistor T1. The capacitor C may be connected between the gate of the driving transistor T2 and the anode of the light emitting diode LD. The light emitting diode LD may include the anode connected to the driving transistor T2, and a cathode connected to a second power supply VSS. The switching transistor T1 and the driving transistor T2 may be NMOS transistors.

As illustrated in FIG. 3, the second pixel PX2 may have the same or similar configuration as the configuration of the first pixel PX1. In other embodiments, the configurations may be different.

An odd sensing select transistor SST1_1 and an even sensing select transistor SST1_2 may be provided as the switch SSW1_1 and the switch SSW1_2 of FIG. 2, respectively. The odd sensing select transistor SST1_1 may be connected to the odd sensing line SL1_1. The even sensing select transistor SST1_2 may be connected to the even sensing line SL1_2. Gates of the odd sensing select transistor SST1_1 and the even sensing select transistor SST1_2 may be turned on in response to a sensing select signal applied to the first sensing select line SSL1. The odd and even sensing select transistors SST1_1 and SST1_2 may be NMOS transistors, but may have a different conductivity in another embodiment.

Electrical characteristics of the first and second pixels PX1 and PX2 may be respectively reflected in signals (e.g., sensing voltages) of the odd and even sensing lines SL1_1 and SL1_2. A scan signal of the first scan line SCL1 and a sensing select signal of the first sensing select line SSL1 may be enabled to a first (e.g., high) logic level (hereinafter, a high level), so that a certain reference data voltage may be transmitted through the first and second data lines DL1 and DL2. In this case, a voltage obtained by subtracting a threshold voltage of the driving transistor T2 from the reference data voltage may be applied to a node between the driving transistor T2 and the light emitting diode LD as a sensing voltage. The sensing voltage may be transmitted to the sensing line through the corresponding sensing select transistor. As such, the sensing voltage may include information about electrical characteristics of each pixel, for example, information about the threshold voltage of the driving transistor T2, as described above.

Figure 4:
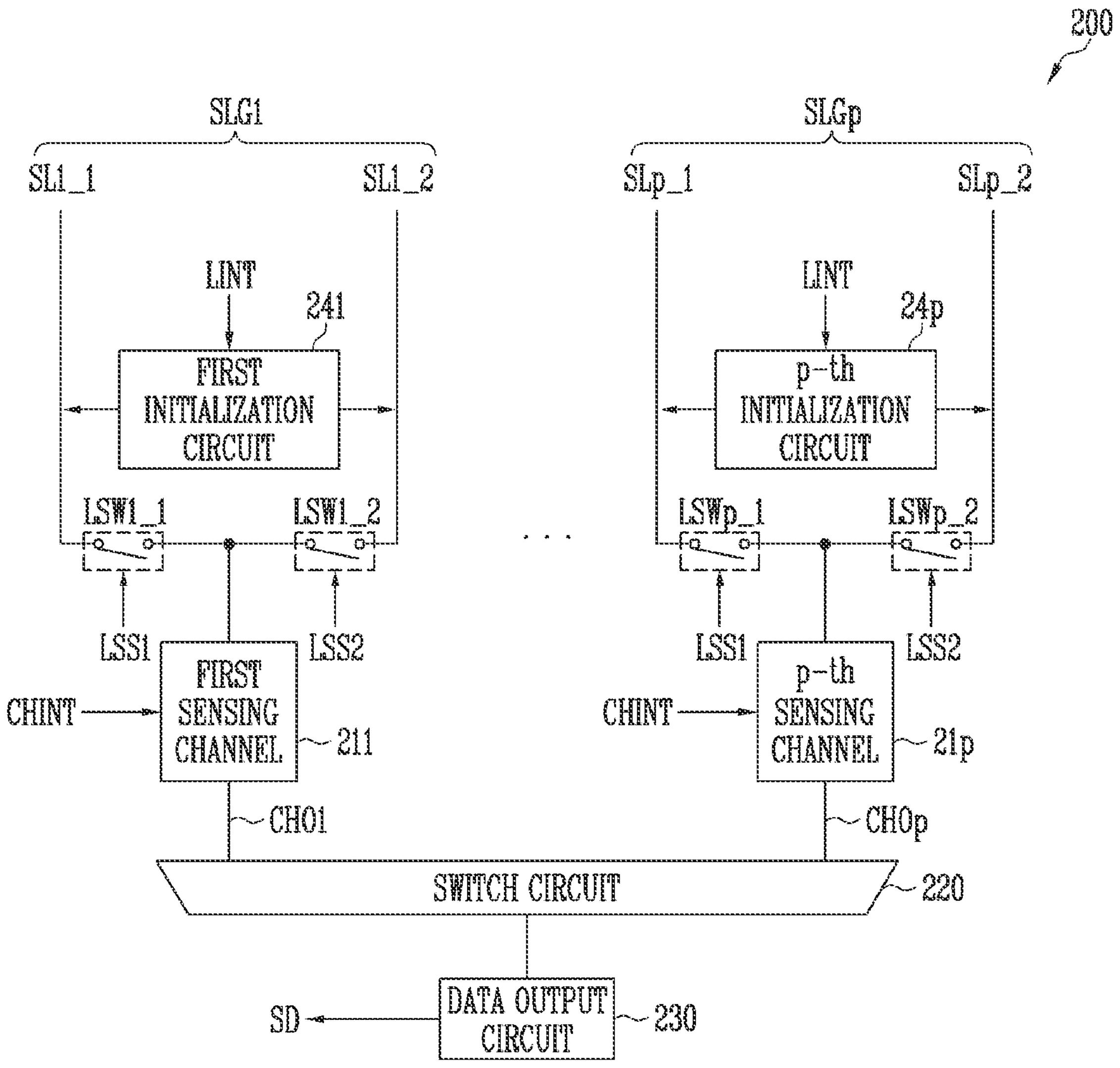
FIG. 4 illustrates an embodiment of a sensing driver.

FIG. 4 is a block diagram illustrating an embodiment of a sensing driver of FIG. 1. Referring to FIG. 4, a sensing driver 200 may include first to p-th sensing channels 211 to 21*p*, a switch circuit 220, and a data output circuit 230.

The first to p-th sensing channels 211 to 21*p* may be operated under control of the controller 120 of FIG. 1. The first to p-th sensing channels 211 to 21*p* may be respectively allocated to the first to p-th sensing line groups SLG1 to SLGp. Sensing lines that belong to each sensing line group may be connected to a corresponding (the same) sensing channel, and the corresponding sensing channel may be time-shared between the sensing lines. The odd and even sensing lines SL1_1 and SL1_2 of the first sensing line group SLG1 may share the first sensing channel 211. The odd and even sensing lines SLp_1 and SLp_2 of the p-th sensing line group SLGp may share the p-th sensing channel 21*p*. As such, odd and even sensing lines SLi_1 and SLi_2 of an i-th sensing line group SLGi may share a first sensing channel 21*i* (where i is an integer identical to or greater than 1 and less than or identical to p).

Each of the first to p-th sensing channels 211 to 21*p* may be configured to sequentially record, therein, sensing voltages reflected in the corresponding odd and even sensing lines. In embodiments, each of the first to p-th sensing channels 211 to 21*p* may include, for example, a sampling capacitor for recording a sensing voltage.

The sensing driver 200 may further include a line select switch connected between each of the odd and even sensing lines and the sensing channel that is shared by the odd and even sensing lines. An odd line select switch LSW1_1 may be connected between the odd sensing line SL1_1 of the first sensing line group SLG1 and the first sensing channel 211. An even line select switch LSW1_2 may be connected between the even sensing line SL1_2 of the first sensing line group SLG1 and the first sensing channel 211. Likewise, an odd line select switch LSWp_1 may be connected between the odd sensing line SLp_1 of the p-th sensing line group SLGp and the p-th sensing channel 21*p*. An even line select switch LSWp_2 may be connected between the even sensing line SLp_2 of the p-th sensing line group SLGp and the p-th sensing channel 21*p*. The odd line select switches LSW1_1 to LSWp_1 may be turned on or off in response to one or more select signals, e.g., in response to the same odd line select signal LSS1. The even line select switches LSW1_2 to LSWp_2 may be turned on or off in response to one or more select signals, e.g., in response to the same even line select signal LSS2.

In accordance with an embodiment of the present disclosure, when sensing voltages from the pixels are reflected in the sensing lines SL1_1 to SLp_1 and SL1_2 to SLp_2 of the first to p-th sensing line groups SLG1 to SLGp, the odd line select switches LSW1_1 to LSWp_1 and the even line select switches LSW1_2 and LSWp_2 are turned off. Thereafter, each of the first to p-th sensing channels 211 to 21*p* may be successively connected to the corresponding odd sensing line and the corresponding sensing line and record a corresponding sensing voltage therein. The first to p-th sensing channels 211 to 21*p* may be initialized before each writing operation is performed. Hence, even though each of the first to p-th sensing channels 211 to 21*p* is shared by the odd sensing line and the even sensing line of the corresponding sensing line group, sensing voltages may be recorded in the first to p-th sensing channels 211 to 21*p* through the odd sensing lines SL1_1 to SLp_1 and the even sensing lines SL1_2 to SLp_2 with relatively high reliability.

The switch circuit 220 may be connected to the first to p-th sensing channels 211 to 21*p* through the first to p-th channel output lines CHO1 to CHOp, respectively. The switch circuit 220 may successively connect each of the first to p-th channel output lines CHO1 to CHOp to the data output circuit 230 under control of the controller 120. As such, the switch circuit 220 allows the first to p-th sensing channels 211 to 21*p* to time-share the data output circuit 230.

The data output circuit 230 may obtain sensing voltages recorded in the first to p-th sensing channels 211 to 21*p* through the first to p-th channel output lines CHO1 to CHOp, and output sensing data SD according to the obtained voltages.

The sensing driver 200 may further include first to p-th initialization circuits 241 to 24*p*. The initialization circuits may control the voltage on the sensing lines to assume an initial (e.g., ground) value during a sensing operation for the display panel. The first to p-th initialization circuits 241 to 24*p* may receive a line initialization signal LINT from the controller 120. In response to the line initialization signal LINT, the first to p-th initialization circuits 241 to 24*p* may respectively initialize the first to p-th sensing line groups SLG1 to SLGp.

The odd and even line select signals LSS1 and LSS2, a channel initialization signal CHINT, and the line initialization signal LINT may be included in the sensing control signal SSCS of FIG. 1.

Figure 5:
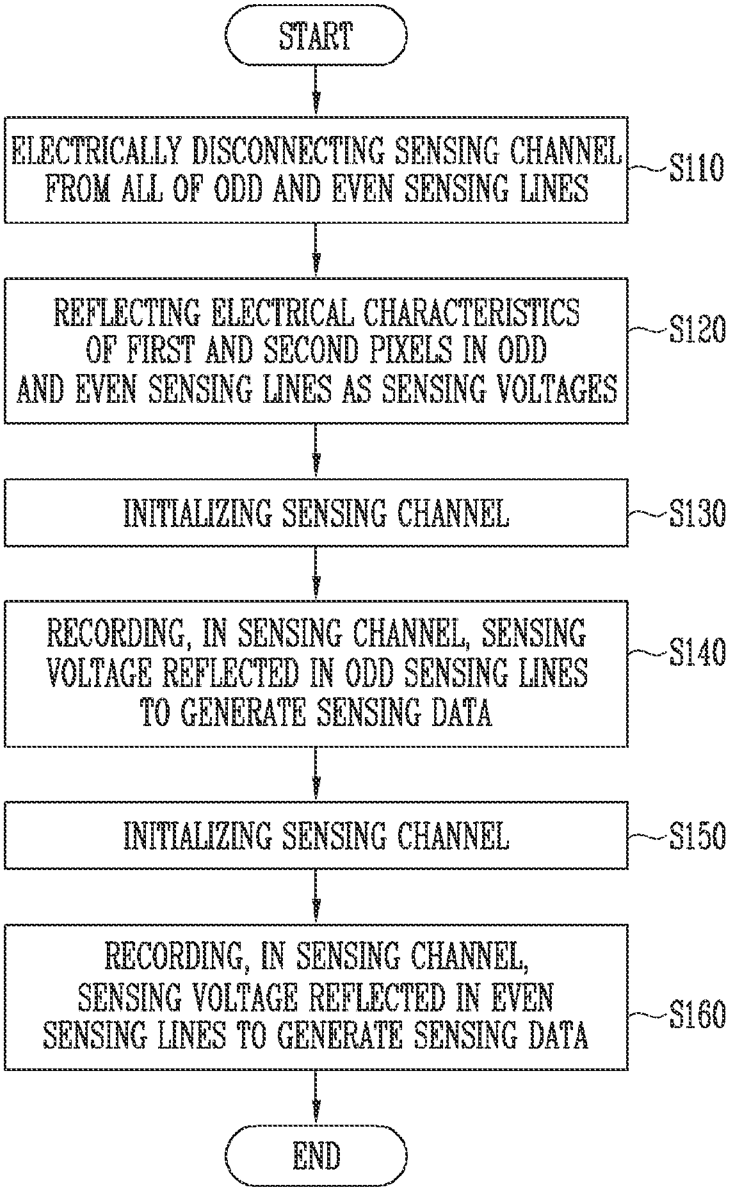
FIG. 5 illustrates an embodiment of a method of sensing electrical characteristics of pixels.

FIG. 5 is a flowchart illustrating a method of sensing electrical characteristics of pixels in accordance with an embodiment of the present disclosure. Hereinafter, for convenience of explanation, embodiments of the present disclosure will be described based on the first sensing channel 211 of the first to p-th sensing channels 211 to 21*p*. The second to p-th sensing channels 212 to 21*p* each may also have the same configuration as that of the first sensing channel 211 and be operated in the same manner as that of the first sensing channel 211.

Referring to FIGS. 4 and 5, at operation S110, the first sensing channel 211 is electrically disconnected (or interrupted) from the odd and even sensing lines SL1_1 and SL1_2. The odd and even line select switches LSW1_1 and LSW1_2 may be turned off by disabling the odd and even line select signals LSS1 and LSS2.

At operation S120, electrical characteristics of the first and second pixels PX1 and PX2 (refer to FIG. 3), e.g., the threshold voltages of the driving transistors T2 of the first and second pixels PX1 and PX2, may be reflected in respective ones of the odd and even sensing lines SL1_1 and SL1_2 as sensing voltages. The electrical characteristics may correspond, for example, to threshold voltages of driving transistors in respective ones of the first and second pixels, mobility, and/or other parameters that are used, for example, to compensate for different electrical characteristics when the pixels are driven.

At operation S130, the first sensing channel 211 is initialized in response to a channel initialization signal CHINT. In embodiments, the first sensing channel 211 may include a sampling capacitor (refer to "SAMC" of FIG. 6) provided to record a sensing voltage therein. The first sensing channel 211 may initialize the sampling capacitor before recording the sensing voltage. In one embodiment, operation S130 may be performed before operation S120.

At operation S140, a sensing voltage reflected in the odd sensing line SL1_1 is recorded in the first sensing channel 211, and a portion of sensing data SD is generated according to the recorded voltage.

At operation S150, the first sensing channel 211 is initialized in response to a channel initialization signal CHINT. In embodiments, the sampling capacitor of the first sensing channel 211 may be re-initialized.

At operation S160, a sensing voltage reflected in the even sensing line SL1_2 is recorded in the first sensing channel 211, and a portion of sensing data SD is generated according to the recorded voltage.

As such, when sensing voltages are reflected in the odd and even sensing lines SL1_1 and SL1_2, the first sensing channel 211 is electrically disconnected from the odd and even sensing lines SL1_1 and SL1_2. Thereafter, the first sensing channel 211 may be successively connected to the odd and even sensing lines SL1_1 and SL1_2 so that the corresponding sensing voltage can be recorded therein. This may be accomplished by selectively activating corresponding ones of the odd and even line select switches LSW1_1 and LSW1_2, as shown, for example, in the timing diagram of FIG. 7 discussed in greater detail below. In one embodiment, the sampling capacitor may be initialized before the sensing voltages on the odd and even sensing lines SL1_1 and SL1_2 are recorded.

Each time a recording operation is performed, the first sensing channel 211 may be first initialized before the recording operation. Hence, even though the first sensing channel 211 is shared by the odd and even sensing lines SL1_1 and SL1_2, the sensing voltages may be reflected in the odd and even sensing lines SL1_1 and SL1_2 with relatively high reliability, and may be recorded in the first sensing channel 211.

Figure 6:
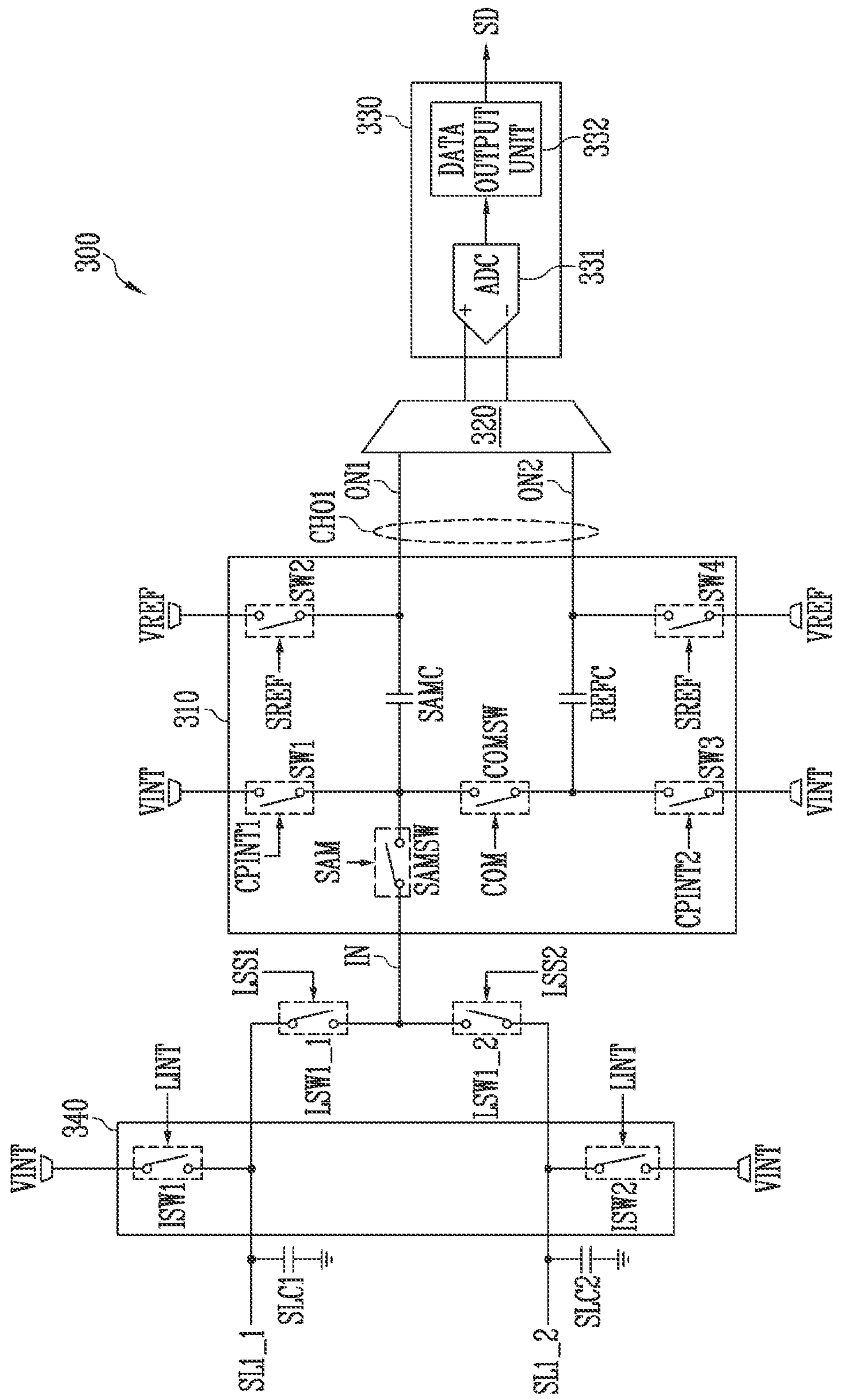
FIG. 6 illustrates an embodiment of a portion of the sensing driver.

FIG. 6 is a block diagram illustrating an embodiment of a portion of the sensing driver of FIG. 4.

Referring to FIG. 6, a sensing driver 300 may include a sensing channel 310, a switch circuit 320, a data output circuit 330, and an initialization circuit 340. The sensing channel 310, the switch circuit 320, the data output circuit 330, and the initialization circuit 340 may be respectively provided as the first sensing channel 211, the switch circuit 220, the data output circuit 230, and the first initialization circuit 241 of FIG. 4. The second to p-th sensing channels 212 to 21*p* of FIG. 4 may also have the same configuration as that of the sensing channel 310 and be connected to the switch circuit 320. Furthermore, the second to p-th initialization circuits 241 to 24*p* of FIG. 4 may have the same configuration as that of the initialization circuit 340.

An odd sensing line capacitor SLC1 may be connected between the odd sensing line SL1_1 and a ground node. The odd sensing line capacitor SLC1 may be for conceptually showing a capacitance or a parasitic capacitance that is included in the odd sensing line SL1_1. Alternatively, the odd sensing line capacitor SLC1 may be a physical element connected to the odd sensing line SL1_1. Likewise, an even sensing line capacitor SLC2 may be connected between the even sensing line SL1_2 and a ground node. Each of the odd sensing line capacitor SLC1 and the even sensing line capacitor SLC2 may have a relatively large predetermined capacitance, compared to that of a sampling capacitor SAMC or a reference capacitor REFC of the sensing channel 310.

The initialization circuit 340 may include first and second initialization switches ISW1 and ISW2. The first initialization switch ISW1 may be connected between an initialization power supply VINT and the odd sensing line SL1_1, and may be turned on in response to a line initialization signal LINT. The second initialization switch ISW2 may be connected between the initialization power supply VINT and the even sensing line SL1_2, and may be turned on in response to a line initialization signal LINT.

The odd line select switch LSW1_1 may be provided between the odd sensing line SL1_1 and an input node IN of the sensing channel 310, and may be turned on in response to an odd line select signal LSS1. The even line select switch LSW1_2 may be provided between the even sensing line SL1_2 and the input node IN, and may be turned on in response to an even line select signal LSS2.

The sensing channel 310 may include a sampling capacitor SAMC, a reference capacitor REFC, a sampling switch SAMSW, a comparison switch COMSW, and first to fourth switches SW1 to SW4. In other embodiments, storage devices different from the aforementioned capacitors may be used.

The sampling capacitor SAMC may include a first end connected to the input node IN, and a second end connected to a first output node ON1 of the sensing channel 310. The sampling switch SAMSW may be connected between the input node IN and the first end of the sampling capacitor SAMC, and may be turned on in response to a sampling signal SAM.

A first end of the reference capacitor REFC may be connected to the first end of the sampling capacitor SAMC. A second end of the reference capacitor REFC may be connected to a second output node ON2 of the sensing channel 310. The first and second output nodes ON1 and ON2 may form a first channel output line CHO1 of the sensing channel 310.

The comparison switch COMSW may be connected between the first end of the sampling capacitor SAMC and the first end of the reference capacitor REFC, and may be turned on in response to a comparison signal COM.

The first switch SW1 may be connected between the initialization power supply VINT and the first end of the sampling capacitor SAMC, and may transmit a voltage of the initialization power supply VINT to the first end of the sampling capacitor SAMC in response to a first capacitor initialization signal CPINT1. In other embodiments, the first switch SW1 may be omitted, and the third switch SW3 and the comparison switch COMSW may perform the function of the first switch SW1. In this case, when the comparison signal COM and the second capacitor initialization signal CPINT2 are enabled, the third switch SW3 and the comparison switch COMSW may transmit the voltage of the initialization power supply VINT to the first end of the sampling capacitor SAMC.

The second switch SW2 may be connected between the second end of the sampling capacitor SAMC and a reference power supply VREF, and may be turned on in response to a reference signal SREF. In one or more embodiments, the reference power supply VREF and the initialization power supply VINT may be substantially the same as each other. In other embodiments, the reference power supply VREF and the initialization power supply VINT may be different from each other. The third switch SW3 may be connected between the initialization power supply VINT and the first end of the reference capacitor REFC, and may be turned on in response to the second capacitor initialization signal CPINT2. The fourth switch SW4 may be between the reference power supply VREF and the second output node ON2, and may be turned on in response to the reference signal SREF.

The line initialization signal LINT, the odd and even line select signals LSS1 and LSS2, and the first and second capacitor initialization signals CPINT1 and CPINT2, the comparison signal COM, and the reference signal SREF may be included in the sensing control signal SSCS output from the controller 120 of FIG. 1. In another embodiment, two or more of these control signals may be separately provided.

The switch circuit 320 may, for example, have the same configuration as that of the switch circuit 220 described with reference to FIG. 4. The switch circuit 320 may successively connect each of the first to p-th channel output lines CHO1 to CHOp to the data output circuit 330 under control of the controller 120 (refer to FIG. 1).

The data output circuit 330 may be operated under control of the controller 120. The data output circuit 330 may include an analog-to-digital converter (ADC) 331 and a data output unit 332. The ADC 331 may be connected to each channel output line, e.g., the first channel output line CHO1, through the switch circuit 320. The ADC 331 may perform an analog-to-digital conversion operation for voltage differences between the first and second output nodes ON1 and ON2 of the connected channel output line, and thus generate sensing data SD. The data output unit 332 may output the sensing data SD generated by the ADC 331. For example, the data output unit 332 may buffer the sensing data SD, and rearrange the buffered sensing data SD and output the rearranged sensing data SD to the controller 120.

Figure 7:
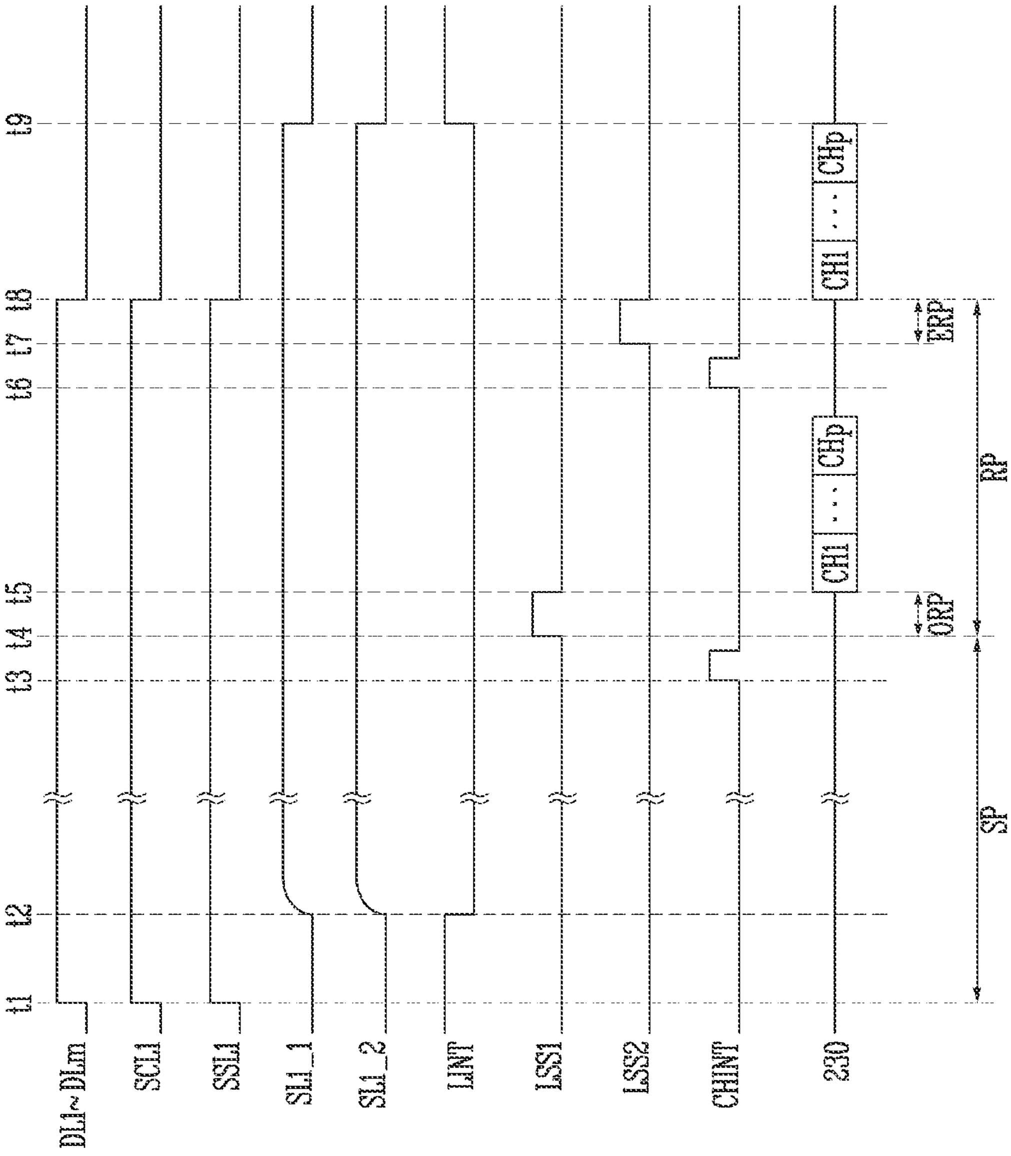
FIG. 7 illustrates an embodiment of signals for the sensing driver.

FIG. 7 is a timing diagram illustrating signals pertaining to the sensing driver of FIG. 4 in accordance with an embodiment of the method of sensing electrical characteristics of the pixels. FIGS. 8 to 14 are circuit diagrams conceptually illustrating a flow of current pertaining to the sensing driver of FIG. 7 at some operations according to an embodiment of the method of sensing electrical characteristics of the pixels.

Referring to FIGS. 6 and 7, at a first time t1, a reference data voltage is applied to each of the data lines DL1 to DLm, a scan signal having a high level is applied to the first scan line SCL1, and a sensing select signal having a high level is applied to the first sensing select line SSL1.

Figure 8:
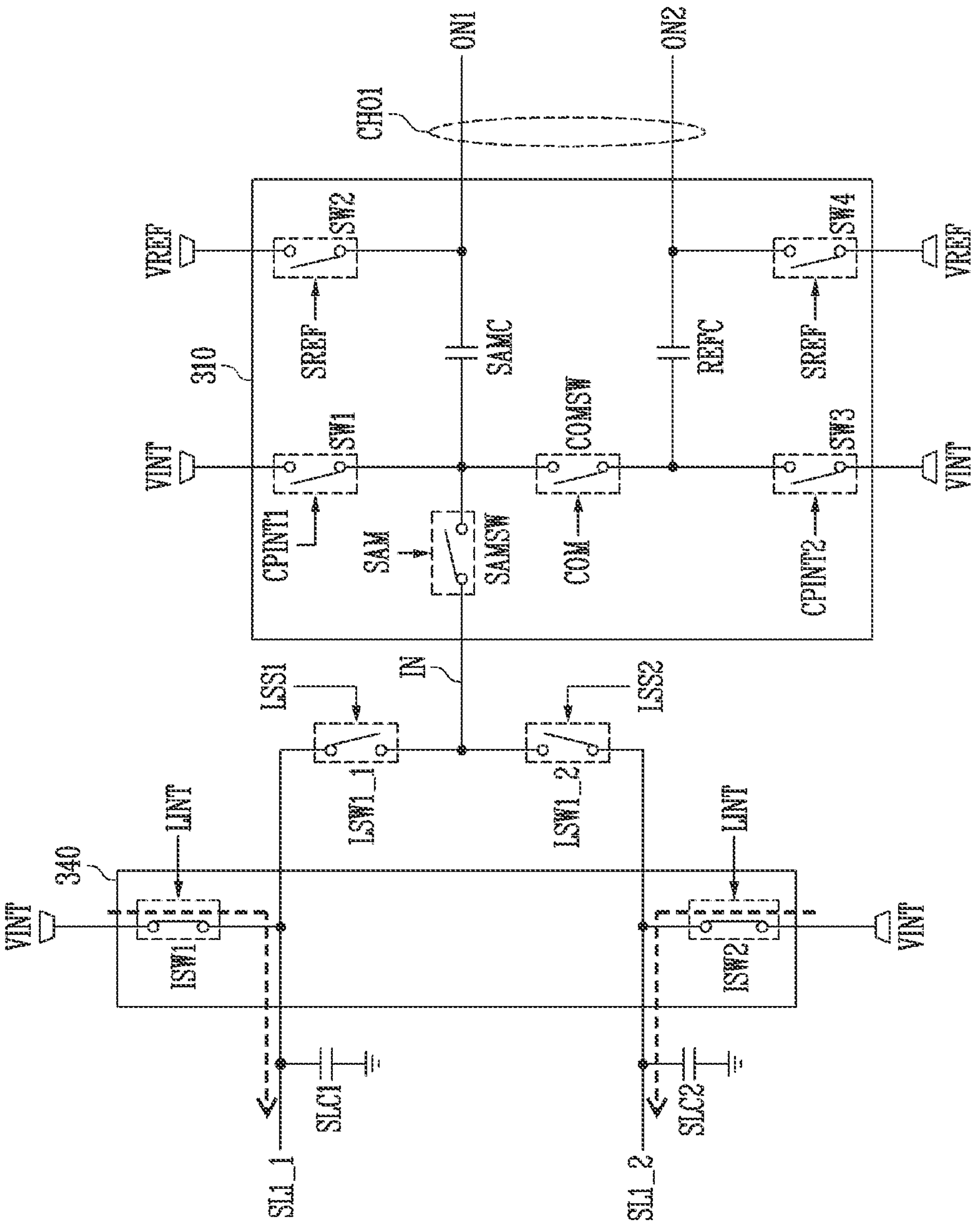
FIGS. 8 to 14 illustrates examples of current flow pertaining to the sensing driver of FIG. 7.

At the first time t1, a line initialization signal LINT is in a state of having been enabled to a first (e.g., high) logic level. As illustrated in FIG. 8, the initialization circuit 340 may apply a voltage of the initialization power supply VINT to each of the odd and even sensing lines SL1_1 and SL1_2 in response to the line initialization signal LINT.

At a second time t2, the line initialization signal LINT is disabled to a second (e.g., low) logic level (hereinafter referred to as a low level). The initialization circuit 340 may separate the odd and even sensing lines SL1_1 and SL1_2 from the initialization power supply VINT. Referring to FIGS. 3 and 7, sensing voltages according to the threshold voltages of the driving transistors T2 of the first and second pixels PX1 and PX2 may be respectively reflected in the odd and even sensing lines SL1_1 and SL1_2. In each of the first and second pixels PX1 and PX2, a voltage obtained by subtracting the threshold voltage of the corresponding driving transistor T2 from the reference data voltage may be applied to a node between the driving transistor T2 and the light emitting diode LD as a sensing voltage. The corresponding sensing voltage may be reflected in the sensing line through the corresponding sensing select transistor. The odd and even sensing lines SL1_1 and SL1_2 may respectively have the odd and even sensing line capacitors SLC1 and SCL2 of FIG. 6. The odd and even sensing line capacitors SLC1 and SCL2 may maintain the reflected sensing voltages.

A preset time elapses from the second time t2, and the time reaches a fourth time t4. A period between the first time t1 and the fourth time t4 may be defined as a sensing period SP provided to reflect electrical characteristics of the pixels of the display panel 110 (refer to FIG. 1) in the odd and even sensing lines SL1_1 and SL1_2, as described above. The sensing period SP may be determined by taking into account the capacitances of the odd and even sensing line capacitors SLC1 and SLC2. The sensing period SP may be relatively longer than a recording period RP.

Referring again to FIGS. 6 and 7, all of the odd and even line select signals LSS1 and LSS2 are disabled to low levels during the sensing period SP, so that each of the odd and even sensing lines SL1_1 and SL1_2 may be electrically separated from the sensing channel 310. Unlike the case where any one of the odd and even sensing lines SL1_1 and SL1_2 is electrically connected to the sensing channel 310 in at least a portion of the sensing period SP, the foregoing enables each of the odd and even sensing lines SL1_1 and SL1_2 to enter the recording period RP under substantially the same conditions. For example, each of the odd and even sensing lines SL1_1 and SL1_2 may be subsequently connected to the sensing channel 310 for substantially the same time in the recording period RP and transmit a sensing voltage to the sensing channel 310. Hence, sensing voltages of the odd and even sensing lines SL1_1 and SL1_2 may be recorded in the sensing channel 310 with relatively high reliability.

At a third time t3 before a recording period ORP (hereinafter, referred to as an odd recording period) for the sensing voltage reflected in the odd sensing line SL1_1, the channel initialization signal CHINT (refer to FIG. 4) is enabled to a predetermined (e.g., high) level in order to initialize the sensing channel 310, e.g., in order to initialize the sampling capacitor of the sensing channel. For example, in accordance with one or more embodiments, the channel initialization signal CHINT may include a first capacitor initialization signal CPINT1. In embodiments, the channel initialization signal CHINT may include first and second capacitor initialization signals CPINT1 and CPINT2. In response to the first capacitor initialization signal CPINT1 having a high level, the first switch SW1 may apply an initialization voltage VINT to the first end of the sampling capacitor SAMC. In response to the second capacitor initialization signal CPINT2 having a high level, the third switch SW3 may apply an initialization voltage VINT to the first end of the reference capacitor REFC. In embodiment, the reference signal SREF may be enabled to a high level. In response to the reference signal SREF having a high level, the second and fourth switches SW2 and SW4 may apply the reference voltage VREF to the second end of the sampling capacitor SAMC and the second end of the reference capacitor REFC.

Figure 9:
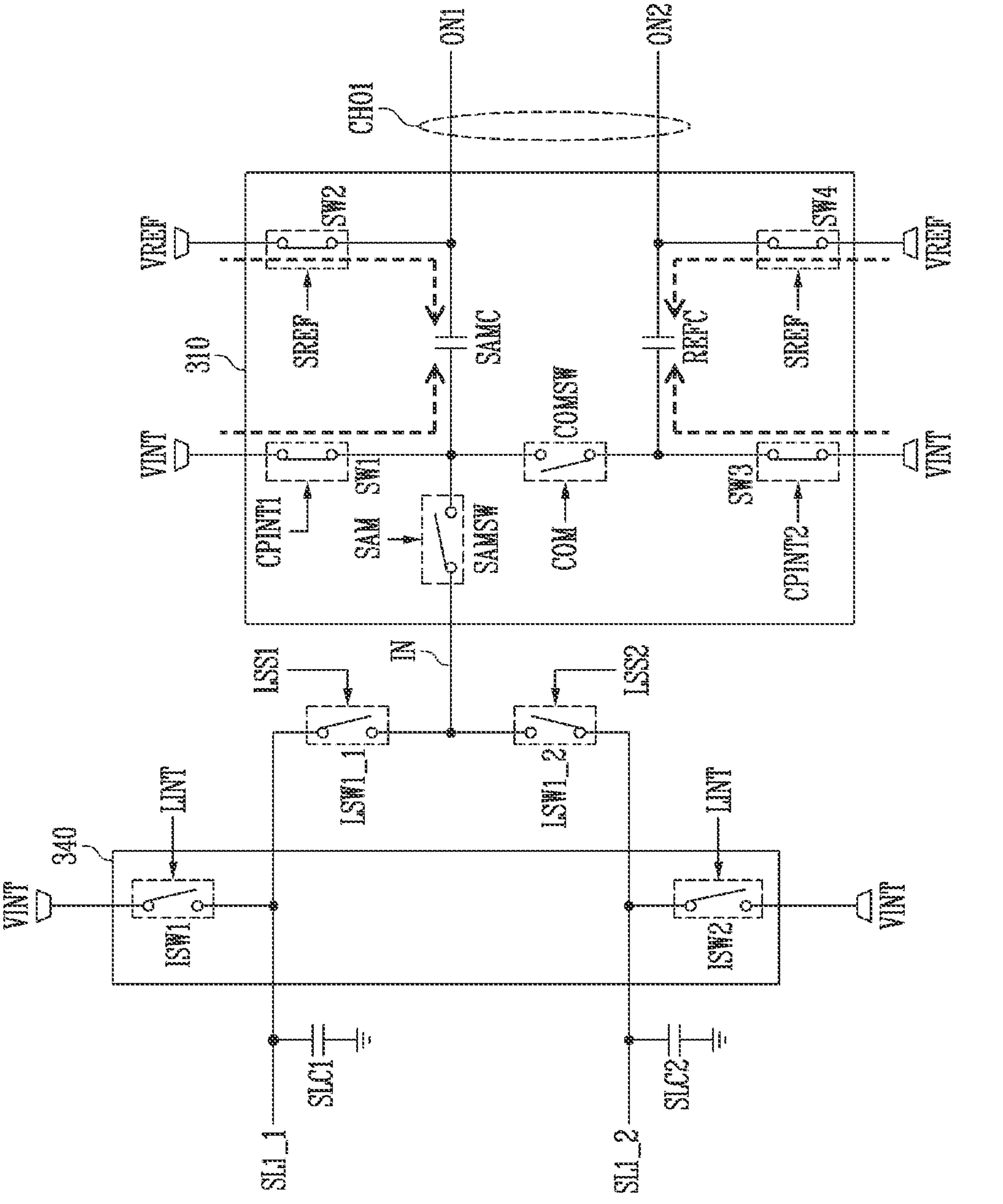

Hence, as illustrated in FIG. 9, the initialization voltage VINT and the reference voltage VREF may be applied to the opposite ends of the sampling capacitor SAMC to initialize the sampling capacitor SAMC. The initialization voltage VINT and the reference voltage VREF may be applied to the opposite ends of the reference capacitor REFC to initialize the reference capacitor REFC.

At the fourth time t4, the odd line select signal LSS1 is enabled to a high level, so that the sensing voltage of the odd sensing line SL1_1 is recorded in the sensing channel 310. As such, the time for which the odd line select signal LSS1 is enabled may be defined as an odd writing period ORP of the writing period RP.

Figure 10:
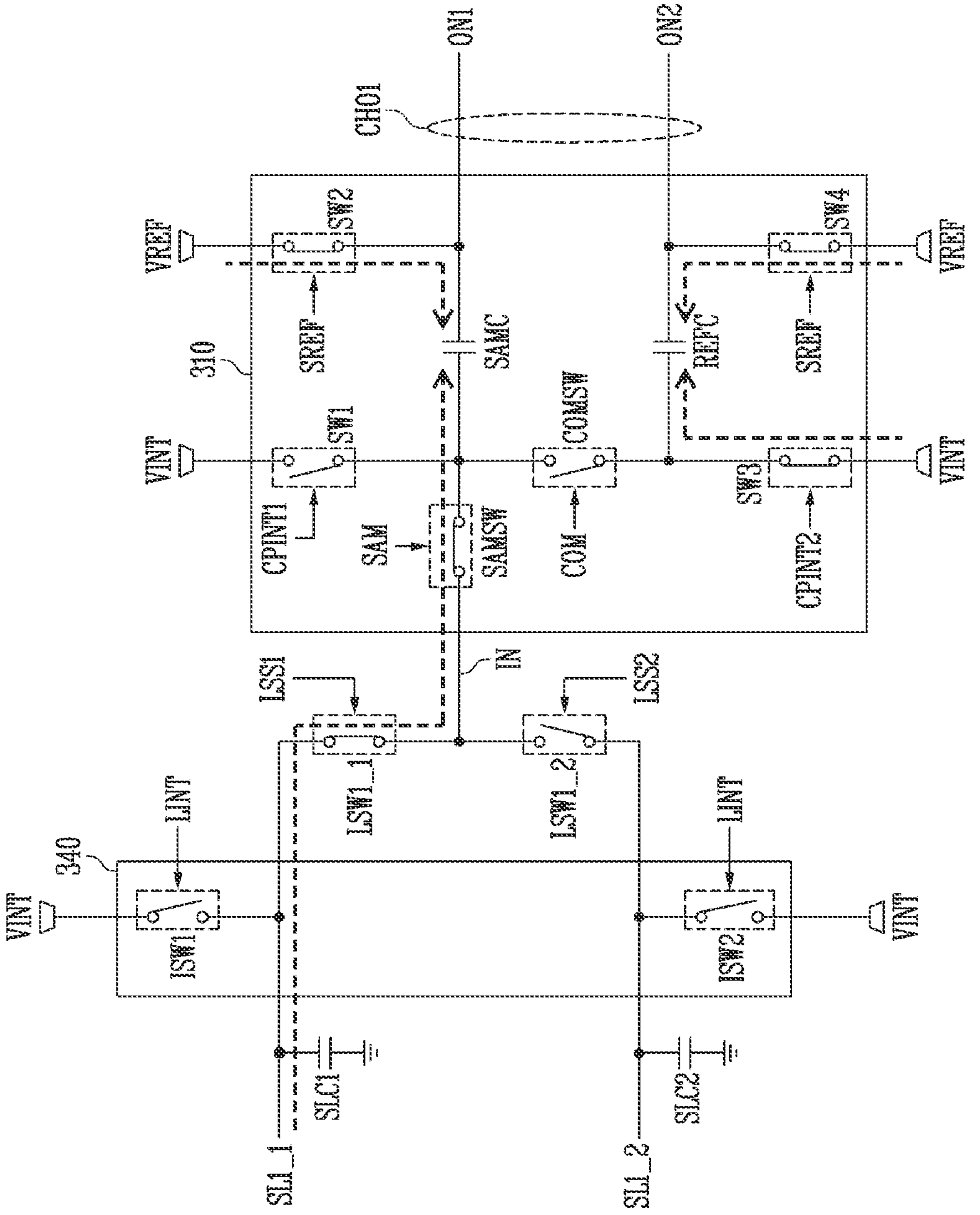

Referring to FIG. 10, the odd line select switch LSW1_1 is turned on, and the sampling switch SAMSW is turned on in response to a sampling signal SAM having a high level. In embodiments, after the odd line select signal LSS1 is enabled, the sampling signal SAM may be enabled during a predetermined (e.g., relatively short) time compared to that of the odd line select signal LSS1. Hence, the sensing voltage of the odd sensing line SL1_1 is transmitted to the first end of the sampling capacitor SAMC. The second and fourth switches SW2 and SW4 may remain turned on in response to the reference signal SREF. The third switch SW3 may remain turned on in response to the second capacitor initialization signal CPINT2. As such, a voltage corresponding to a difference between the sensing voltage of the odd sensing line SL1_1 and the reference voltage VREF may be recorded in the sampling capacitor SAMC.

Referring again to FIGS. 6 and 7, at a fifth time t5, the odd line select signal LSS1 is disabled to a low level, so that recording is terminated. The voltage recorded in the sensing channel 310 may be provided to the data output circuit 330. The data output circuit 330 may successively receive recorded voltages CH1 to CHp from the first to p-th channel output lines CH01 to CHOp (refer to FIG. 4), and generate a first portion of the sensing data SD. The first portion of the generated sensing data SD may correspond to electrical characteristics of the pixels connected to the first to p-th odd sensing lines SL1_1 to SLp_1

Figure 11:
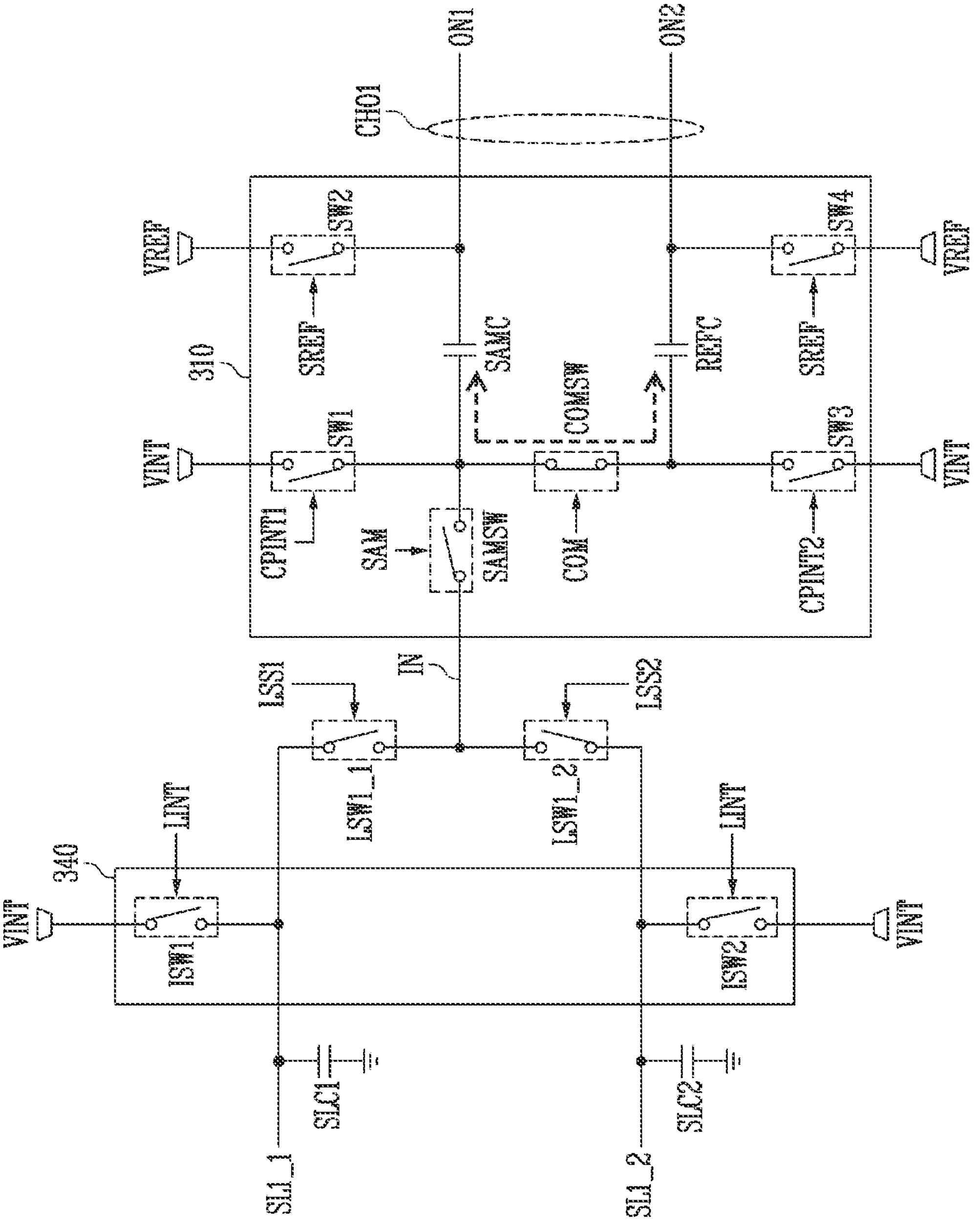

Referring to FIG. 11, the odd line select switch LSW1_1 is turned off in response to an odd line select signal LSS1, so that the odd sensing line SL1_1 and the sensing channel 310 are electrically separated from each other. In embodiments, the sampling signal SAM is disabled, so that the sampling switch SAMSW may be turned off. The first and second capacitor initialization signals CPINT1 and CPINT2 and the reference signal SREF are disabled, so that the first to fourth switches SW1 to SW4 may be turned off. The comparison signal COM is enabled, so that the comparison switch COMSW may be turned off.

The first end of the sampling capacitor SAMC and the first end of the reference capacitor REFC may be connected to each other through the comparison switch COMSW and thus have substantially the same voltage. For example, the voltage of the first end of the sampling capacitor SAMC may be reduced to the foregoing same voltage. The voltage of the first end of the reference capacitor REFC may be increased to the foregoing same voltage. The second end of the sampling capacitor SAMC and the second end of the reference capacitor REFC may be in a floating state. Hence, the voltage of the second end of the sampling capacitor SAMC may vary depending on a voltage change (e.g., a voltage reduction) on the first end of the sampling capacitor SAMC.

The voltage of the second end of the reference capacitor REFC may vary depending on a voltage change (e.g., a voltage reduction) on the first end of the sampling capacitor SAMC. The difference in voltage between the second end of the sampling capacitor SAMC and the second end of the reference capacitor REFC may be a difference between the sensing voltage recorded in the first end of the sampling capacitor SAMC and the initialization voltage VINT. The difference between the sensing voltage and the initialization voltage VINT may be output to the data output circuit 330 through the first channel output line CHO1.

Figure 12:
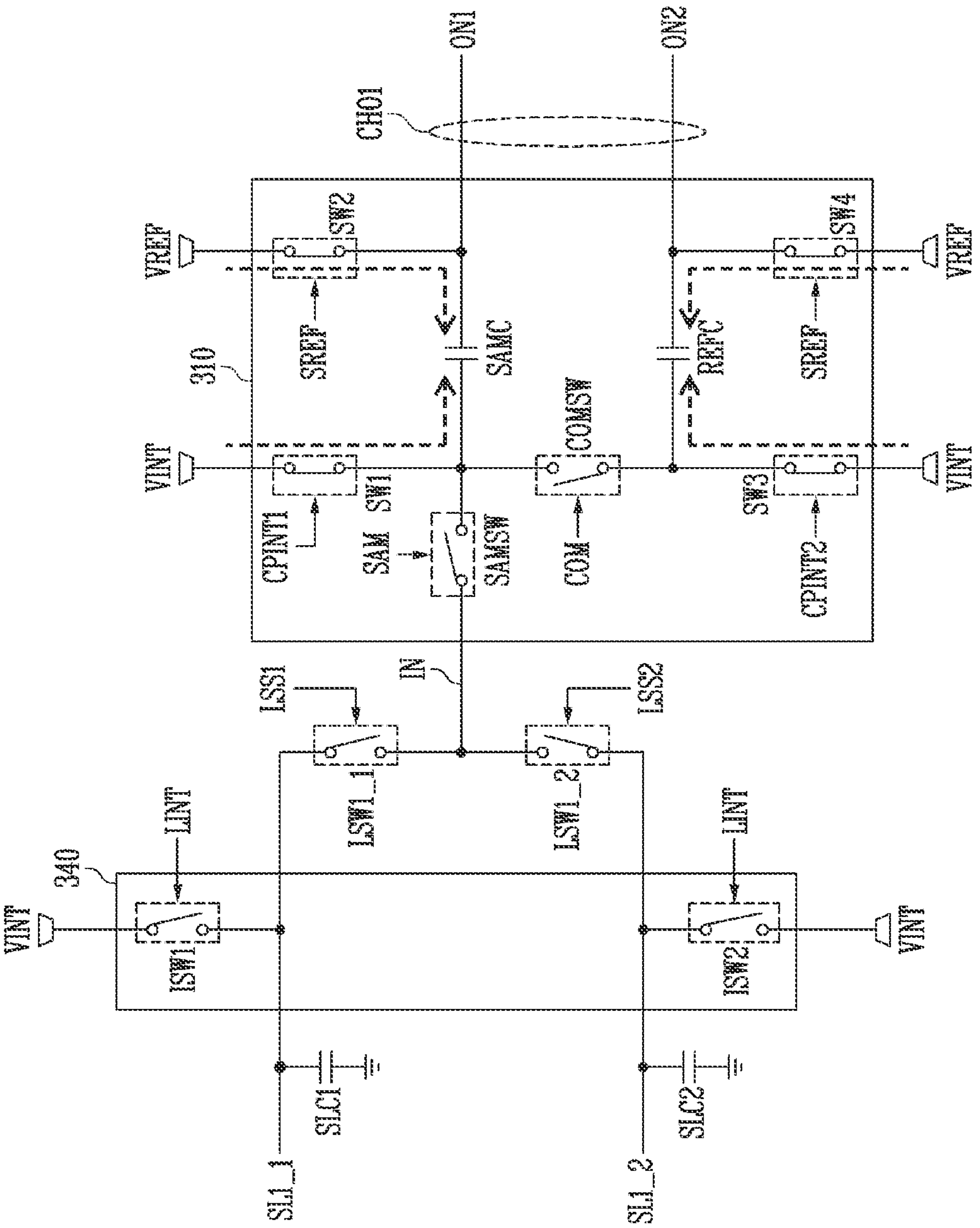

Referring again to FIGS. 6 and 7, at a sixth time t6 before a recording period ERP (hereinafter, referred to as an even recording period) for the sensing voltage reflected in the even sensing line SL1_2, the channel initialization signal CHINT is enabled to a high level in order to re-initialize the sensing channel 310. The sensing channel 310 may be operated in the same manner as that of the foregoing description pertaining to the third time t3. As illustrated in FIG. 12, the first to fourth switches SW1 to SW4 are turned on, so that the initialization voltage VINT and the reference voltage VREF may be applied to the opposite ends of the sampling capacitor SAMC. The initialization voltage VINT and the reference voltage VREF may be applied to the opposite ends of the reference capacitor REFC.

At a seventh time t7, the even line select signal LSS2 is enabled to a high level, so that the sensing voltage of the even sensing line SL1_2 is recorded in the sensing channel 310. As such, the time for which the even line select signal LSS2 is enabled may be defined as an even writing period ERP of the writing period RP.

Figure 13:
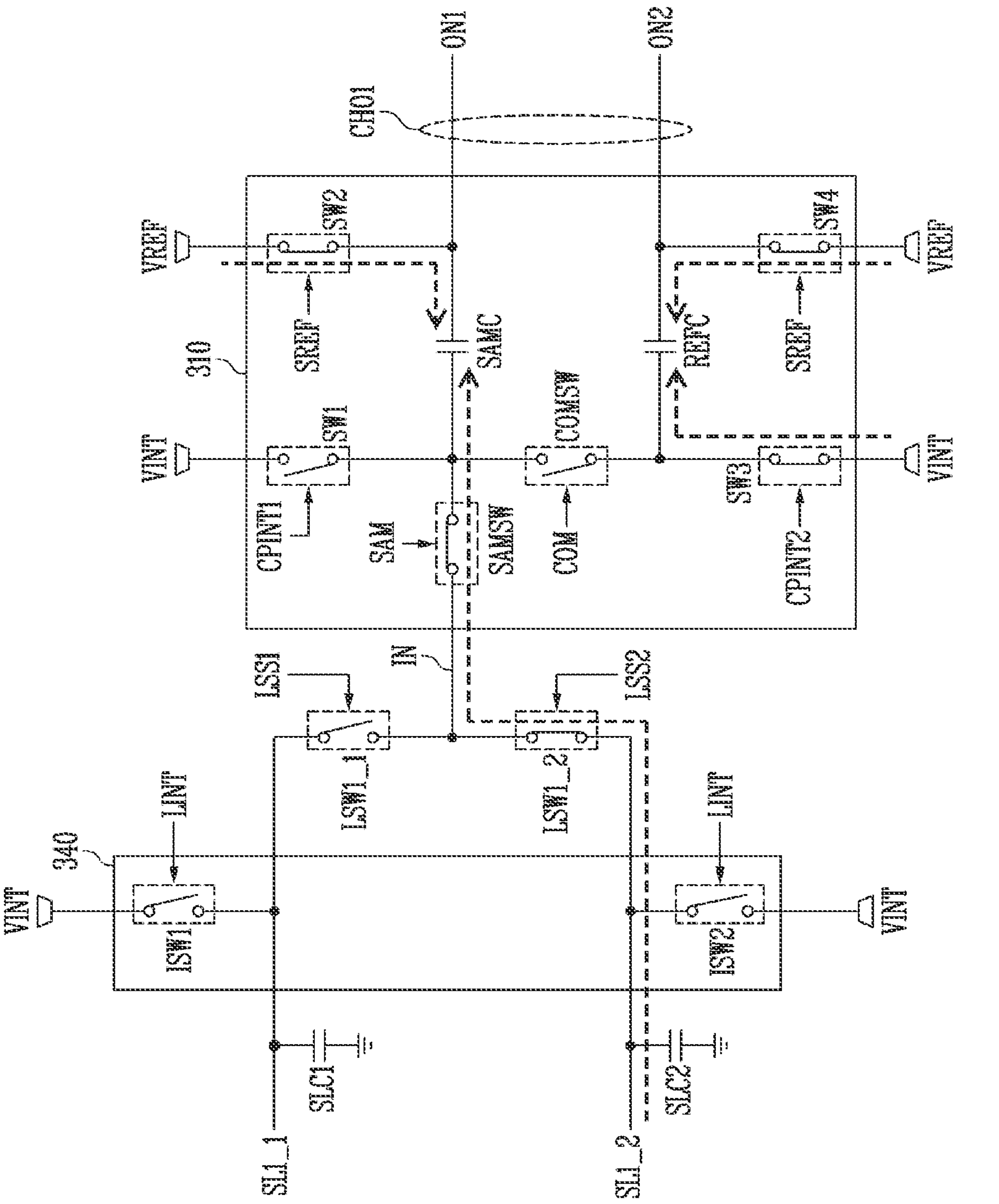

Referring to FIG. 13, the even line select switch LSW1_2 is turned on, and the sampling switch SAMSW is turned on in response to a sampling signal SAM having a high level. In embodiments, after the even line select signal LSS2 is enabled, the sampling signal SAM may be enabled during a predetermined (e.g., relatively short) time compared to that of the even line select signal LSS2. As described above, because the sampling capacitor SAMC is initialized at the sixth time t6 in the same manner as that of the third time t3, the sensing voltage of the even sensing line SL1_2 may be recorded in the first end of the sampling capacitor SAMC under substantially the same conditions as that of the odd sensing line SL1_1. The second and fourth switches SW2 and SW4 may remain turned on in response to the reference signal SREF. The third switch SW3 may remain turned on in response to the second capacitor initialization signal CPINT2. As such, a voltage corresponding to a difference between the sensing voltage of the even sensing line SL1_2 and the reference voltage VREF may be recorded in the sampling capacitor SAMC.

Referring again to FIGS. 6 and 7, at an eighth time t8, the even line select signal LSS2 is disabled to a low level, so that recording is terminated, and the voltage recorded in the sensing channel 310 may be provided to the data output circuit 330. The data output circuit 330 may successively receive recorded voltages CH1 to CHp from the first to p-th channel output lines CHO1 to CHOp (refer to FIG. 4), and generate a second portion of the sensing data SD. The second portion of the generated sensing data SD may correspond to electrical characteristics of the pixels connected to the first to p-th even sensing lines SL1_2 to SLp_2

Figure 14:
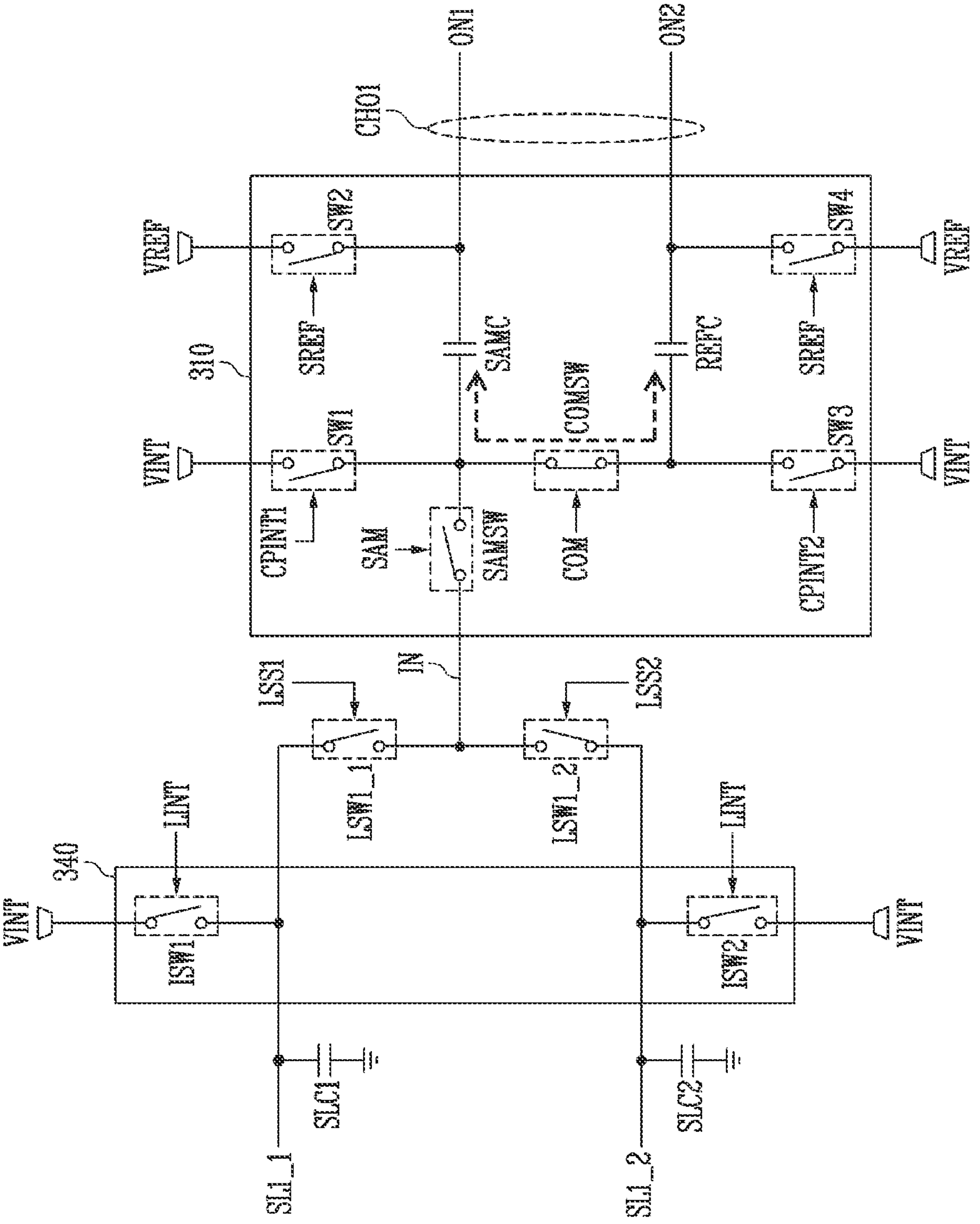

Referring to FIG. 14, the even line select switch LSW1_2 is turned off in response to an even line select signal LSS2, so that the even sensing line SL1_2 and the sensing channel 310 are electrically separated from each other. In the same manner as described with reference to FIG. 11, the sensing voltage recorded in the first end of the sampling capacitor SAMC may be output through the first channel output line CHO1. For example, the sampling signal SAM is disabled, so that the sampling switch SAMSW may be turned off, the first to fourth switches SW1 to SW4 may be turned off, and the comparison switch COMSW may be turned on. Therefore, a difference in voltage between the second end of the sampling capacitor SAMC and the second end of the reference capacitor REFC may indicate a difference between the sensing voltage and the voltage of the initialization power supply VINT, and may be output to the data output circuit 330 through the first channel output line CHO1.

As such, the operation of connecting each of the odd and even sensing lines SL1_1 and SL1_2 to the sensing channel 310 and recording a corresponding sensing voltage in the sensing channel 310 may be performed after an initialization operation on the sensing channel 310 is performed. Hence, sensing voltages of the odd and even sensing lines SL1_1 and SL1_2 may be recorded in the sensing channel 310 under substantially the same conditions. Therefore, sensing data SD having enhanced reliability may be provided.

Figure 15:
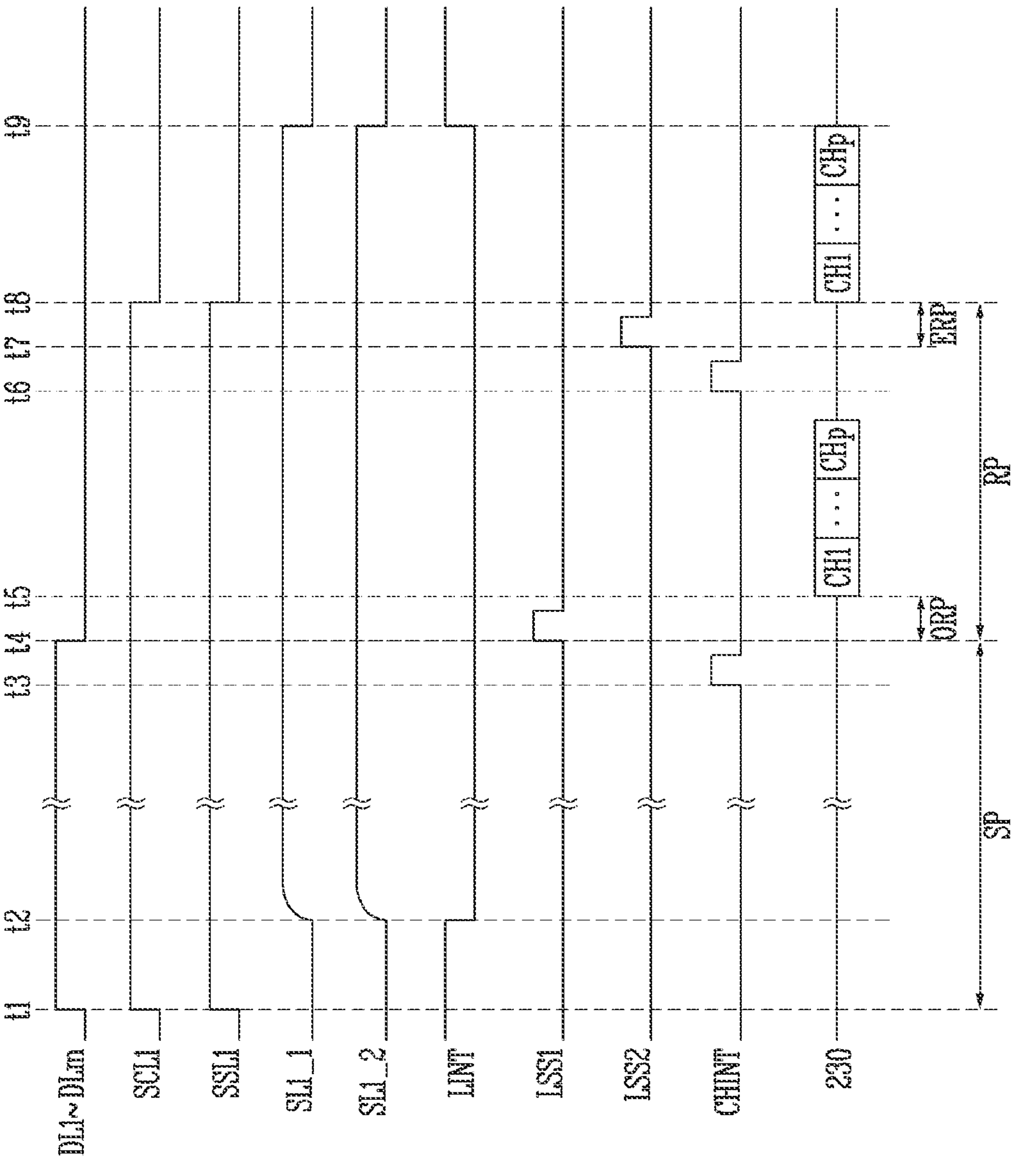
FIG. 15 illustrates an embodiment of signals for a sensing driver.

FIG. 15 is a timing diagram illustrating signals pertaining to the sensing driver in accordance with another embodiment of the method of sensing the electrical characteristics of the pixels. The timing diagram of FIG. 15 is the same as that of FIG. 7, except for the voltage signal of the data lines DL1 to DLm. Hereinafter, repetitive explanations will be omitted.

Referring to FIG. 15, a first reference data voltage may be applied to the data lines DL1 to DLm from the first time t1 to the fourth time t4. At the fourth time t4, a second reference data voltage different from the first reference data voltage may be applied to the data lines DL1 to DLm. In embodiments, the second reference data voltage may be different from (e.g., lower than) the first reference data voltage and, for example, be a data voltage corresponding to a black gray scale.

Referring to FIG. 3 along with FIG. 15, at the fourth time t4, the switching transistors T1 of the first and second pixels PX1 and PX2 may transmit the second reference data voltages of the first and second data lines DL1 and DL2 to the gates of the driving transistors T2 in response to a scan signal of the first scan line SCL1. The odd and even sensing select transistors SST1_1 and SST1_2 may transmit (in response to a sensing select signal of the first sensing select line SSL1) voltages of nodes between the second driving transistors T2 and the light emitting diodes LE to the odd and even sensing lines SL1_1 and SL1_2 as sensing voltages. As the voltages of the first and second data lines DL1 and DL2 are reduced, the voltages of the nodes between the second driving transistors T2 and the light emitting diodes LD may be reduced by the capacitors C.

In one embodiment, the driving transistors T2 may be NMOS transistors. In this case, leakage current of the driving transistors T2 may be reduced by the second reference data voltage being lower than the first reference data voltage. For example, gate-source voltages of the driving transistors T2 may be reduced. Even though the even recording period ERP is later than the odd recording period ORP (for example, due to reduced leakage current of the driving transistors T2 during a time difference between the even recording period ERP and the odd recording period ORP), the sensing voltage of the even sensing line SL1_2 is allowed to be recorded in the sensing channel 310 (refer to FIG. 6) under conditions substantially identical or similar to that of the sensing voltage of the odd sensing line SL1_1. Hence, sensing voltages of the odd and even sensing lines SL1_1 and SL1_2 may be recorded in the sensing channel 310 with relatively high reliability.

Figure 16:
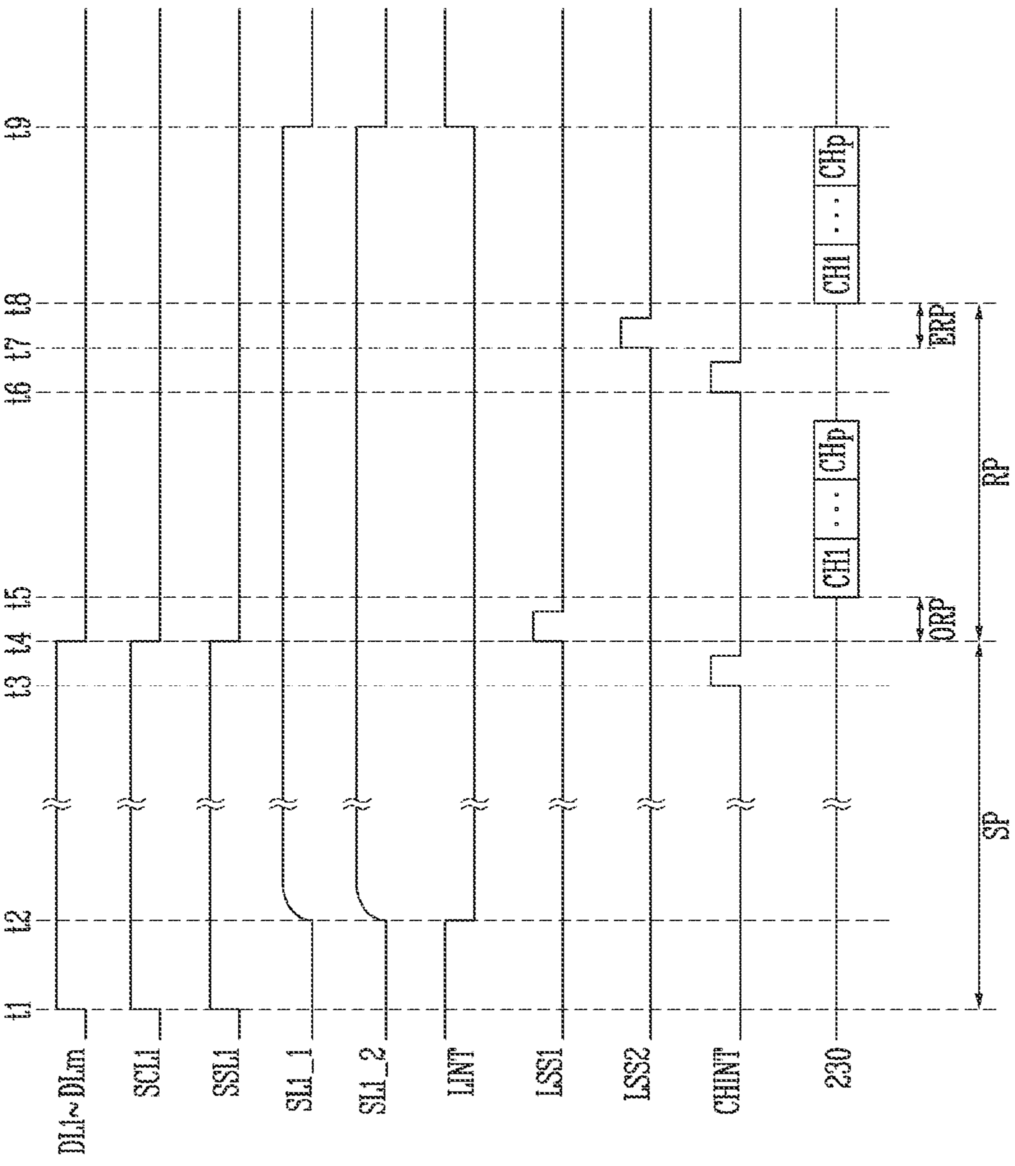
FIG. 16 illustrates an embodiment of signals for a sensing driver.

FIG. 16 is a timing diagram illustrating signals pertaining to the sensing driver in accordance with another embodiment of the method of sensing electrical characteristics of the pixels. The timing diagram of FIG. 16 is the same as that of FIG. 15, except for the scan signal of the first scan line SCL1 and the sensing select signal of the first sensing select line SSL1. Hereinafter, repetitive explanations will be omitted.

Referring to FIG. 16, at the fourth time t4, the scan signal of the first scan line SCL1 and the sensing select signal of the first sensing select line SSL1 are disabled to predetermined (e.g., low) levels. Referring to FIG. 3 along with FIG. 16, the switching transistors T1 of the first and second pixels PX1 and PX2 are turned off in response to a disabled scan signal of the first scan line SCL1, and the odd and even sensing select transistors SST1_1 and SST1_2 are turned off in response to a disabled sensing select signal of the first sensing select line SSL1.

Hence, before the recording period RP, each of the odd and even sensing lines SL1_1 and SL1_2 may be electrically separated from the corresponding pixel in the same manner, and thus may not receive a sensing voltage. In other words, each of the odd and even sensing lines SL1_1 and SL1_2 may receive a sensing voltage from the corresponding pixel during substantially the same time period. During the recording period RP, the odd and even sensing lines SL1_1 and SL1_2 are electrically separated from the first and second pixels PX1 and PX2, but due to the odd and even sensing line capacitors SLC1 and SCL2 (refer to FIG. 6) having relatively large capacitances, the sensing voltages that are maintained therein may be reliably recorded in the sensing channel 310 (refer to FIG. 6). Consequently, electrical characteristics of the first and second pixels PX1 and PX2 may be recorded in the sensing channel 310 through the odd and even sensing lines SL1_1 and SL1_2 with relatively high reliability.

Figure 17:
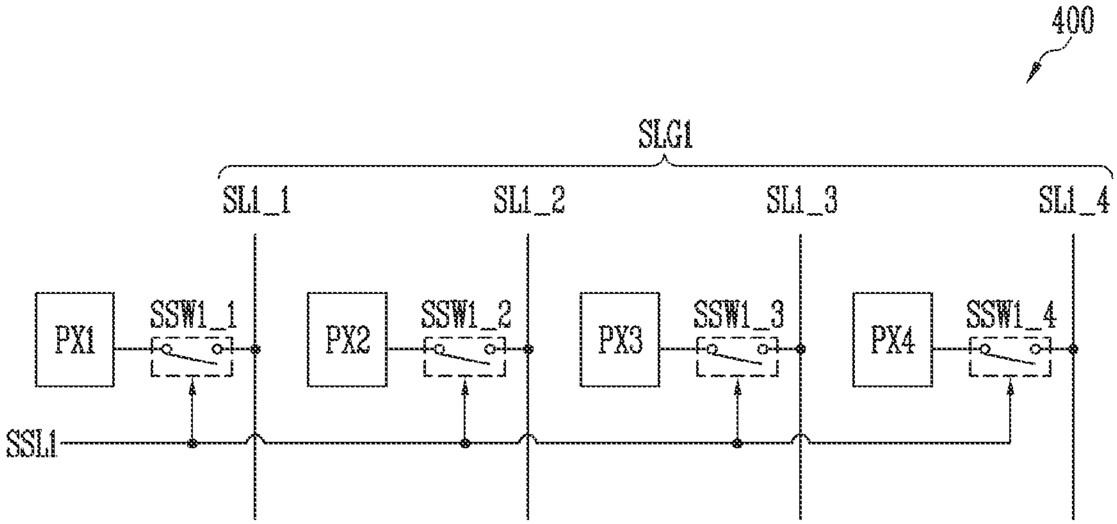
FIG. 17 illustrates an embodiment of a portion of a display panel.

FIG. 17 is a block diagram illustrating another embodiment of a portion of a display panel of FIG. 1. In FIG. 17, for convenience of explanation, only some of the pixels of the display panel 110 of FIG. 1 are illustrated.

Referring to FIG. 17, four adjacent pixels PX1 to PX4 of the display panel 400 may be connected to four sensing lines SL1_1, SL1_2, SL1_3, and SL1_4 of one sensing line group. The first to m-th sensing lines SL1 to SLm of FIG. 1 may be grouped. Each of the plurality of sensing lines groups may include two or more sensing lines. In FIG. 17, there is illustrated the case where the first sensing line group SLG1 that is any one of the plurality of sensing line groups includes first to fourth sensing lines SL1_1, SL1_2, SL1_3, and SL1_4. It can be understood that the number of sensing lines included in each sensing line group can be increased or reduced.

The first sensing line SL1_1 may be connected to a first pixel PX1 through a switch SSW1_1. The second sensing line SL1_2 may be connected to a second pixel PX2 through a switch SSW1_2. The third sensing line SL1_3 may be connected to a third pixel PX3 through a switch SSW1_3. The fourth sensing line SL1_4 may be connected to a fourth pixel PX4 through a switch SSW1_4. The switches SSW1_1, SSW1_2, SSW1_3, and SSW1_4 may be turned on in response to a sensing select signal of the first sensing select line SSL1.

Figure 18:
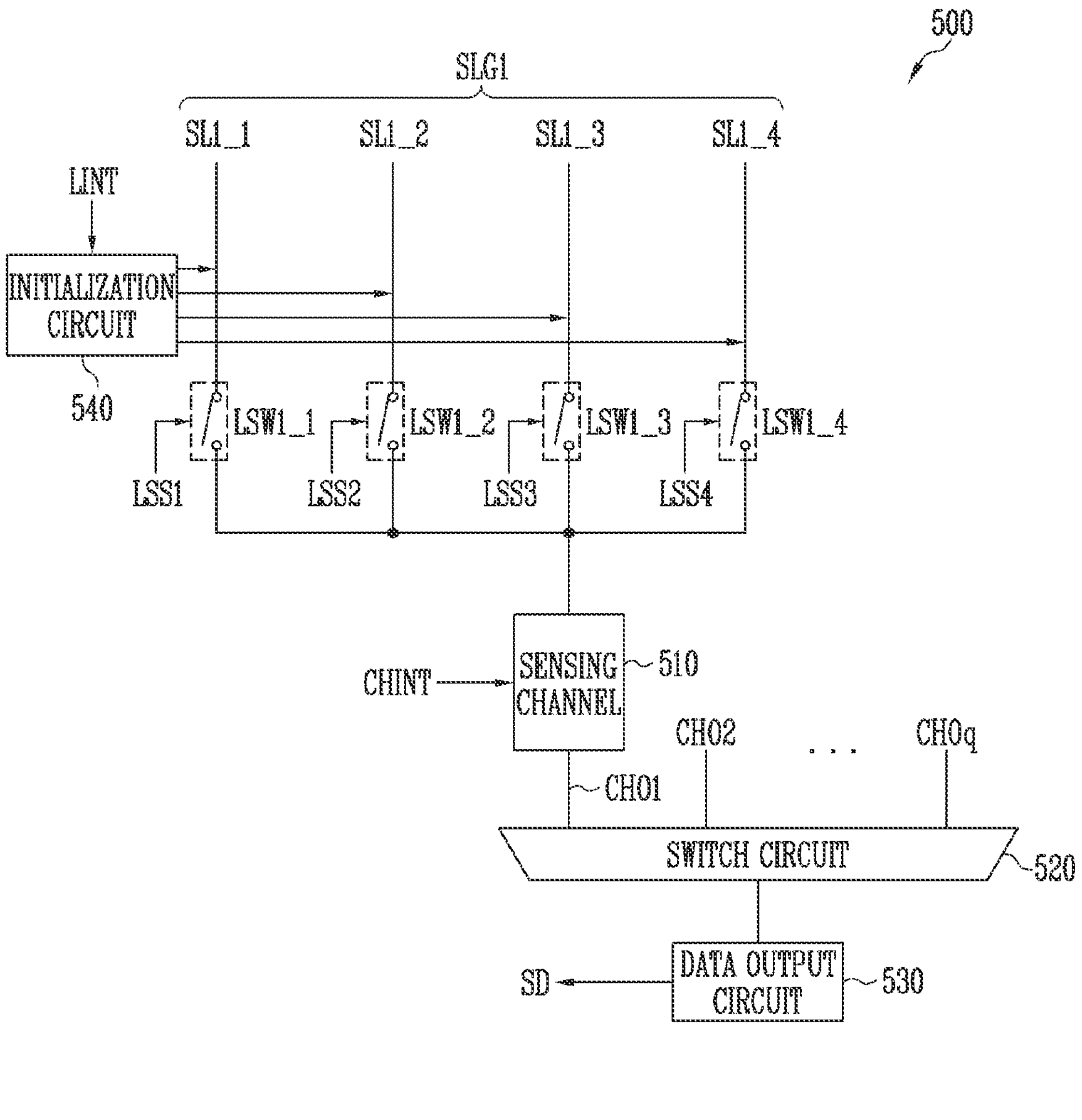
FIG. 18 illustrates an embodiment of a sensing driver.

FIG. 18 is a block diagram illustrating an embodiment of the sensing driver connected with the display panel of FIG. 17. In FIG. 18, for convenience of explanation, there is illustrated a sensing channel 510 connected to the first sensing line group SLG1 having the first to m-th sensing lines SL1 to SLm of FIG. 1, and the other sensing channels are omitted. It can be understood that the other sensing channels may be respectively connected to second to q-th channel output lines CHO2 to CHOq of FIG. 18.

Referring to FIG. 18, a sensing driver 500 may include a sensing channel 510, a switch circuit 520, a data output circuit 530, and an initialization circuit 540 which are connected to the first sensing line group SLG1 of FIG. 17.

The first to fourth sensing lines SL1_1, SL1_2, SL1_3, and SL1_4 may time-share the sensing channel 510. In this way, the sensing channel 510 may selectively receive signals (e.g., voltages) from the first to fourth sensing lines SL1_1, SL1_2, SL1_3, and SL1_4. To achieve the foregoing, the first to fourth sensing lines SL1_1, SL1_2, SL1_3, and SL1_4 may be connected to the sensing channel 510 through first to fourth line select switches LSW1_1 to LSW1_4, respectively. The first to fourth line select switches LSW1_1 to LSW1_4 may be turned on in response to first to fourth line select signals LSS1 to LSS4.

The sensing channel 510 may be operated under control of the controller 120 (refer to FIG. 1), and may record sensing voltages that are respectively reflected in the first to fourth sensing lines SL1_1, SL1_2, SL1_3, and SL1_4.

The switch circuit 520 may be operated under control of the controller 120 (refer to FIG. 1), and may successively connect each of the first to q-th channel output lines CHO1 to CHOp to the data output circuit 530. The data output circuit 530 may receive voltages recorded in the respective sensing channels through the first to q-th channel output lines CHO1 to CHOp, generate sensing data SD, buffer the sensing data SD, and output the sensing data SD.

The initialization circuit 540 may initialize the first to fourth sensing lines SL1_1, SL1_2, SL1_3, and SL1_4 in response to a line initialization signal LINT. In FIG. 18, for convenience of explanation, there is illustrated the initialization circuit 540 connected to the first sensing line group SLG1. In embodiments, the sensing driver 500 may further include initialization circuits corresponding to the other sensing lines groups. In other embodiments, the initialization circuit 540 may initialize not only the first sensing line group SLG1 but also one or more of the other sensing line groups.

As such, a larger number of sensing lines than two sensing lines (odd and even sensing lines) may share a single sensing channel. As described with reference to FIGS. 4 and 5, during an operation of sensing the pixels, when sensing voltages are reflected in the sensing lines SL1_1 to SL1_4 of each sensing line group, the sensing channel 510 may be electrically disconnected from the sensing lines SL1_1 to SL1_4. Thereafter, the sensing channel 510 may be connected to each of the sensing lines SL1_1 to SL1_4, so that each time the corresponding sensing voltage is recorded an operation of initializing the sensing channel 510 may be first performed. In embodiments, as described with reference to FIG. 15, before entering the recording period RP, a reduced reference data voltage may be applied to the data lines DL1 to DLm. In embodiments, as described with reference to FIG. 16, before entering the recording period RP, a scan signal of the first scan line SCL1 and a sensing select signal of the first sensing select line SSL1 may be disabled to low levels.

Various embodiments of the present disclosure may provide a display device and method for performing an operation of sensing pixels with enhanced reliability.

The effects of the present disclosure are not limited by the foregoing, and other various effects are anticipated herein. While various exemplary embodiments have been described above, those skilled in the art will appreciate that various modifications, additions and substitutions are possible, without departing from the scope and spirit of the present disclosure. Therefore, the embodiments disclosed in this specification are only for illustrative purposes rather than limiting the technical spirit of the present disclosure. The scope of the present disclosure must be defined by the accompanying claims. The embodiments may be combined to form additional embodiments.

What is claimed is:

1. A display device comprising:

a display panel including first and second pixels respectively connected to first and second sensing lines;

a sensing driver including a single sensing channel shared by the first and the second sensing lines; and a controller configured to control the display panel and the sensing driver, wherein the controller is further configured to:

in a first time period, electrically disconnect the shared single sensing channel from the first and the second sensing lines and receive sensing voltages on respective ones of the first and the second sensing lines, the sensing voltages indicative of electrical characteristics of corresponding ones of the first and the second pixels; and in a second time period, selectively record the sensing voltages on the first and the second sensing lines in the shared single sensing channel, the sensing voltages selectively recorded by time-sharing the shared single sensing channel with the first and second sensing lines.

2. The display device according to claim 1, wherein the controller is further configured to:

initialize the sensing channel before the sensing voltage on the first sensing line is recorded in the sensing channel; and initialize the sensing channel before the sensing voltage on the second sensing line is recorded in the sensing channel.

3. The display device according to claim 1, wherein:

the sensing driver includes a first switch and a second switch, an input node of the sensing channel is connected to the first sensing line through the first switch and is connected to the second sensing line through the second switch, and the first and the second switches are turned off during the first time period.

4. The display device according to claim 3, wherein:

the sensing channel includes a sampling capacitor connected to the input node, and the sensing voltages on the first and the second sensing lines are recorded in the sampling capacitor by time-sharing the sensing channel with the first and second sensing lines.

5. The display device according to claim 4, wherein the sensing channel is further configured to in response to control signals from the controller:

initialize the sampling capacitor before the sensing voltage on the first sensing line is recorded in the sampling capacitor, and initialize the sampling capacitor before the sensing voltage on the second sensing line is recorded in the sampling capacitor.

6. The display device according to claim 4, wherein the sensing channel comprises:

a third switch configured to connect a first end of the sampling capacitor to the input node in response to a first control signal;

a fourth switch configured to connect the first end of the sampling capacitor to an initialization voltage node in response to a second control signal; and a fifth switch configured to connect a second end of the sampling capacitor to a reference voltage node in response to a third control signal.

7. The display device according to claim 6, wherein:

the sensing channel comprises a reference capacitor, a first end of the reference capacitor is connected to the first end of the sampling capacitor, and the second end of the sampling capacitor and a second end of the reference capacitor correspond to output ends of the sensing channel.

8. The display device according to claim 1, further comprising:

a data driver connected to the first and the second pixels through first and second data lines, wherein:

the controller controls the data driver, and the data driver is configured to:

apply a first reference data voltage to the first and the second pixels through the first and the second data lines in the first time period; and apply a second reference data voltage lower than the first reference data voltage to the first and the second pixels through the first and the second data lines in the second time period.

9. The display device according to claim 1, further comprising:

a scan driver configured to operate under control of the controller, wherein:

the display panel comprises a first switch connected between the first pixel and the first sensing line and a second switch connected between the second pixel and the second sensing line, and the scan driver is configured to transmit a sensing select signal to the first and the second switches, turn on the first and the second switches in the first time period, and turn off the first and the second switches before the second time period starts.

10. The display device according to claim 1, further comprising:

a scan driver configured to operate under control of the controller, wherein:

the first and the second pixels are respectively connected to first and second data lines, each of the first and the second pixels comprises a switching transistor configured to transmit, in response to a scan signal, a voltage signal received through the corresponding data line to the corresponding pixel, and the scan driver is configured to provide the scan signal, turn on the switching transistor in the first time period, and turn off the switching transistor before the second time period starts.

11. The display device according to claim 1, wherein the sensing driver comprises a data output circuit configured to output sensing data in response to each of the sensing voltages recorded in the sensing channel by time-sharing the sensing channel.

12. A display device comprising:

a display panel including a plurality of rows of pixels connected to a plurality of sensing lines, the plurality of sensing lines being grouped into sensing line groups;

a sensing driver including a single sensing channel for each sensing line group, each single sensing channel being shared by the sensing lines of the corresponding sensing line group; and a controller configured to control the display panel and the sensing driver, wherein the controller is further configured to:

in a first time period, electrically disconnect each of the single sensing channels from the corresponding sensing line group and receive sensing voltages on the plurality of sensing lines that are indicative of electrical characteristics of the plurality of pixels; and in a second time period, record the sensing voltages of the sensing lines in each sensing line group in the corresponding single sensing channel by timing-sharing the single sensing channel with the sensing lines of the group.

13. The display device according to claim 12, wherein the controller is further configured to, before each time the sensing voltages of the sensing lines in each of the sensing line groups are recorded in the corresponding sensing channel by time-sharing, initialize the corresponding sensing channel.

14. The display device according to claim 12, further comprising:

a data driver connected to the plurality of pixels through a plurality of data lines, wherein:

the controller is further configured to control the data driver, the data driver is configured to:

in the first time period, apply a first reference data voltage to the plurality of pixels through the plurality of data lines; and in the second time period, apply a second reference data voltage lower than the first reference data voltage to the plurality of pixels through the plurality of data lines.

15. The display device according to claim 12, further comprising:

a scan driver configured to operate under control of the controller, wherein:

the display panel includes a plurality of switches connected between the plurality of pixels and the plurality of sensing lines, and the scan driver is configured to transmit a sensing select signal to the plurality of switches, turn on the plurality of switches in the first time period, and turn off the plurality of switches before the second time period starts.

16. The display device according to claim 12, further comprising:

a scan driver configured to operate under control of the controller, wherein:

the plurality of pixels are respectively connected to a plurality of data lines, each of the plurality of pixels comprises a switching transistor configured to transmit, in response to a scan signal, a voltage signal received through the corresponding data line to the corresponding pixel, and the scan driver is configured to provide the scan signal, turn on the switching transistor in the first time period, and turn off the switching transistor before the second time period starts.

17. A method of performing an operation of sensing electrical characteristics of pixels, wherein first and second pixels among the pixels are respectively connected to first and second sensing lines, the method comprising:

receiving, in a first time period, sensing voltages on respective ones of the first and second sensing lines that are indicative of electrical characteristics of the first and the second pixels;

electrically disconnecting a single sensing channel shared by the first and the second sensing lines from the first and the second sensing lines while the sensing voltages are received on the first and the second sensing lines; and in a second time period, connecting the first and the second sensing lines to the shared single sensing channel by time-sharing the shared single sensing channel with the first and second sensing lines, and successively recording the sensing voltages on the first and the second sensing lines in the shared single sensing channel.

18. The method according to claim 17, further comprising:

initializing the sensing channel before the sensing voltage reflected in the first sensing line is recorded in the sensing channel; and initializing the sensing channel before the sensing voltage reflected in the second sensing line is recorded in the sensing channel.

19. An apparatus, comprising:

a first sensing line coupled to a first pixel;

a second sensing line coupled to a second pixel; and a shared single sensing channel selectively coupled to the first sensing line and the second sensing line, wherein, in a first time period, the shared single sensing channel is electrically disconnected from the first and second sensing lines, and the first and second sensing lines are respectively configured to receive first and second sensing voltages that are indicative of electrical characteristics of corresponding ones of the first and second pixels, wherein, in a second time period, the shared single sensing channel is selectively coupled to the first and second sensing lines and configured to record the first and second sensing voltages by time-sharing the shared single sensing channel with the first and second sensing lines.

20. The apparatus of claim 19, wherein the sensing channel includes a storage device to alternately store the first sensing voltage and the second sensing voltage.

21. The apparatus of claim 20, further comprising:

an initialization circuit configured to initialize the storage device before each of the first sensing voltage and the second sensing voltage are stored in the storage device.

22. The apparatus of claim 21, wherein the storage device includes a sampling capacitor.

23. The apparatus of claim 21, further comprising:

an initialization circuit configured to initialize the first sensing line and the second sensing line.

24. The apparatus of claim 19, further comprising:

an output circuit configured to output sensing data that corresponds to the first and second sensing voltages.

25. The apparatus of claim 19, wherein the electrical characteristics include threshold voltages of driving transistors of corresponding ones of the first and second pixels.

* * * * *